United States Patent
Smith

(10) Patent No.: US 9,674,182 B2
(45) Date of Patent: *Jun. 6, 2017

(54) SYSTEMS AND METHODS FOR DISTRIBUTED TRUST COMPUTING AND KEY MANAGEMENT

(71) Applicant: Intel Corporation, Santa Clara, CA (US)

(72) Inventor: Ned M. Smith, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,756

(22) Filed: Oct. 15, 2015

(65) Prior Publication Data
US 2016/0105430 A1 Apr. 14, 2016

Related U.S. Application Data

(63) Continuation of application No. 13/631,881, filed on Sep. 29, 2012, now Pat. No. 9,215,249.

(51) Int. Cl.
*H04L 29/06* (2006.01)
*H04L 9/08* (2006.01)
(Continued)

(52) U.S. Cl.
CPC .......... *H04L 63/0853* (2013.01); *G06F 21/51* (2013.01); *G06F 21/54* (2013.01);
(Continued)

(58) Field of Classification Search
None
See application file for complete search history.

(56) References Cited

U.S. PATENT DOCUMENTS 7,574,600 B2 8/2009 Smith
8,032,942 B2 10/2011 Smith et al.
(Continued)

OTHER PUBLICATIONS

Zou, et al.; "Trusted Deployment of Virtual Execution Environment in Grid Systems;" Springer-Verlag, Asian 2009, LNCS 5913; pp. 124-136.
(Continued)

*Primary Examiner* — Saleh Najjar
*Assistant Examiner* — Louis Teng
(74) *Attorney, Agent, or Firm* — Grossman, Tucker, Perreault & Pfleger, PLLC

(57) ABSTRACT

Devices, systems, and methods for conducting trusted computing tasks on a distributed computer system are described. In some embodiments, a client device initiates a trusted task for execution within a trusted execution environment of a remote service provider. The devices, systems, and methods may permit the client to evaluate the trusted execution capabilities of the service provider via a planning and attestation process, prior to sending data/code associated with the trusted task to the service provider for execution. Execution of the trusted task may be performed while enforcing security and/or compartmentalization context on the data/code. Systems and methods for managing and exchanging encryption keys are also described. Such systems and methods may be used to maintain the security of the data/code before during, and/or after the execution of the trusted task.

27 Claims, 10 Drawing Sheets

(51) Int. Cl.
*G06F 21/51* (2013.01)
*G06F 21/57* (2013.01)
*G06F 21/54* (2013.01)
*H04L 29/08* (2006.01)

(52) U.S. Cl.
CPC .......... *G06F 21/57* (2013.01); *H04L 9/0872* (2013.01); *H04L 29/08135* (2013.01); *H04L 63/061* (2013.01); *H04L 63/20* (2013.01); *G06F 2221/2107* (2013.01); *H04L 63/0428* (2013.01); *H04L 63/06* (2013.01); *H04L 2209/127* (2013.01)

(56) References Cited

U.S. PATENT DOCUMENTS

| | | | |
|---|---|---|---|
| 8,074,262 | B2 | 12/2011 | Scarlata |
| 8,675,237 | B2 | 3/2014 | Matsukawa |
| 8,924,727 | B2 | 12/2014 | Smith et al. |
| 2005/0125537 | A1 | 6/2005 | Martins et al. |
| 2005/0257245 | A1* | 11/2005 | Patrick ............... H04L 63/0263 726/1 |
| 2005/0262362 | A1* | 11/2005 | Patrick ................ H04L 63/20 713/193 |
| 2006/0136235 | A1* | 6/2006 | Keohane ............ G06F 9/45512 705/1.1 |
| 2007/0195960 | A1* | 8/2007 | Goldman .................. H04L 9/30 380/286 |
| 2009/0106551 | A1* | 4/2009 | Boren .................. H04L 9/0822 713/158 |
| 2011/0145598 | A1 | 6/2011 | Smith et al. |
| 2012/0303952 | A1 | 11/2012 | Smith et al. |
| 2013/0347058 | A1 | 12/2013 | Smith et al. |
| 2014/0013116 | A1 | 1/2014 | Smith et al. |
| 2014/0095867 | A1 | 4/2014 | Smith et al. |
| 2014/0096177 | A1 | 4/2014 | Smith et al. |
| 2014/0096178 | A1 | 4/2014 | Shippy et al. |

OTHER PUBLICATIONS

Lamport, Leslie; "Time, Clocks, and the Ordering of Events in a Distributed System;" Communications of the ACM; Jul. 1978, vol. 21, No. 7, pp. 558-565.

England, et al.; "A Trusted Open Platform;" IEEE Jul. 2003, pp. 55-62.

Krawczyk, Hugo; "SIGMA: the 'SIGn-and-MAc' Approach to Authenticated Diffie-Hellman and its Use in the IKE Protocols;" Proceedings of Crypto 2003, Springer Verlag Lecture Notes in Computer Science No. 2729, pp. 399-423.

* cited by examiner

SYSTEMS AND METHODS FOR DISTRIBUTED TRUST COMPUTING AND KEY MANAGEMENT

CROSS-REFERENCE TO RELATED APPLICATIONS

The present application is a continuation of U.S. patent application Ser. No. 13/631,881, filed on Sep. 29, 2012, the entire disclosure of which is incorporated herein by reference.

FIELD

The present disclosure relates to systems and methods for distributed trust computing and associated key management. More particularly, the present disclosure relates to systems and methods for the management of keys for multi-level secure distribution task execution in a network-based trusted execution environment.

BACKGROUND

Trusted computing platforms may rely on hardware isolation to create a trusted execution environment (TEE) in which to perform security sensitive operations such as backing up sensitive data with a cloud backup service, sharing sensitive information such as photos, meeting minutes, documents, etc., with individuals via a social networking site, etc. Alternatively, or additionally, such platforms may integrate a security co-processor (e.g., manageability engine, converged security engine (CSE) for secure processing needs. TEE environments may be used to perform cryptographic operations, e.g., using trusted platform module (TPM) technology, platform trust technology (PTT), identity protection technology (IPT), and the like.

In some instances it may be desirable to leverage distributed computing to perform trusted tasks. In this regard, systems and methods have been proposed to export trusted tasks from one computer (client) to another computer (service provider) for execution, e.g., over the internet, an enterprise network, a mesh network, etc. While such systems and methods can allow execution of a trusted task on the service provider, the code and/or data associated with the trusted task may only be protected during transmission between the client and service provider, and not while it is resident on the service provider. As a result, the data and/or code may be subject to attack by other (potentially malicious) software on the service provider, e.g., as the trusted task is executed and/or while the results of the executed task are retrieved.

Furthermore, real-world trusted computing applications often operate on data that has varying degrees of sensitivity (security). For example, a single trusted computing task may operate on a data set that includes data that is designated as unclassified, secret, top-secret, top-secret secure compartmentalized, combinations thereof, and the like. Likewise, the data associated with a trusted task may be organized into various compartments. For example, a single trusted task may operate on data and/or code that is/are organized by business division such as finance, human resources, engineering, and the like. When the trusted task is executed on a distributed computer system, the data set/code may be sealed by the client with a single key. In such instances, applicable security and/or compartmentalization context may be lost when the service provider unseals the data/code.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
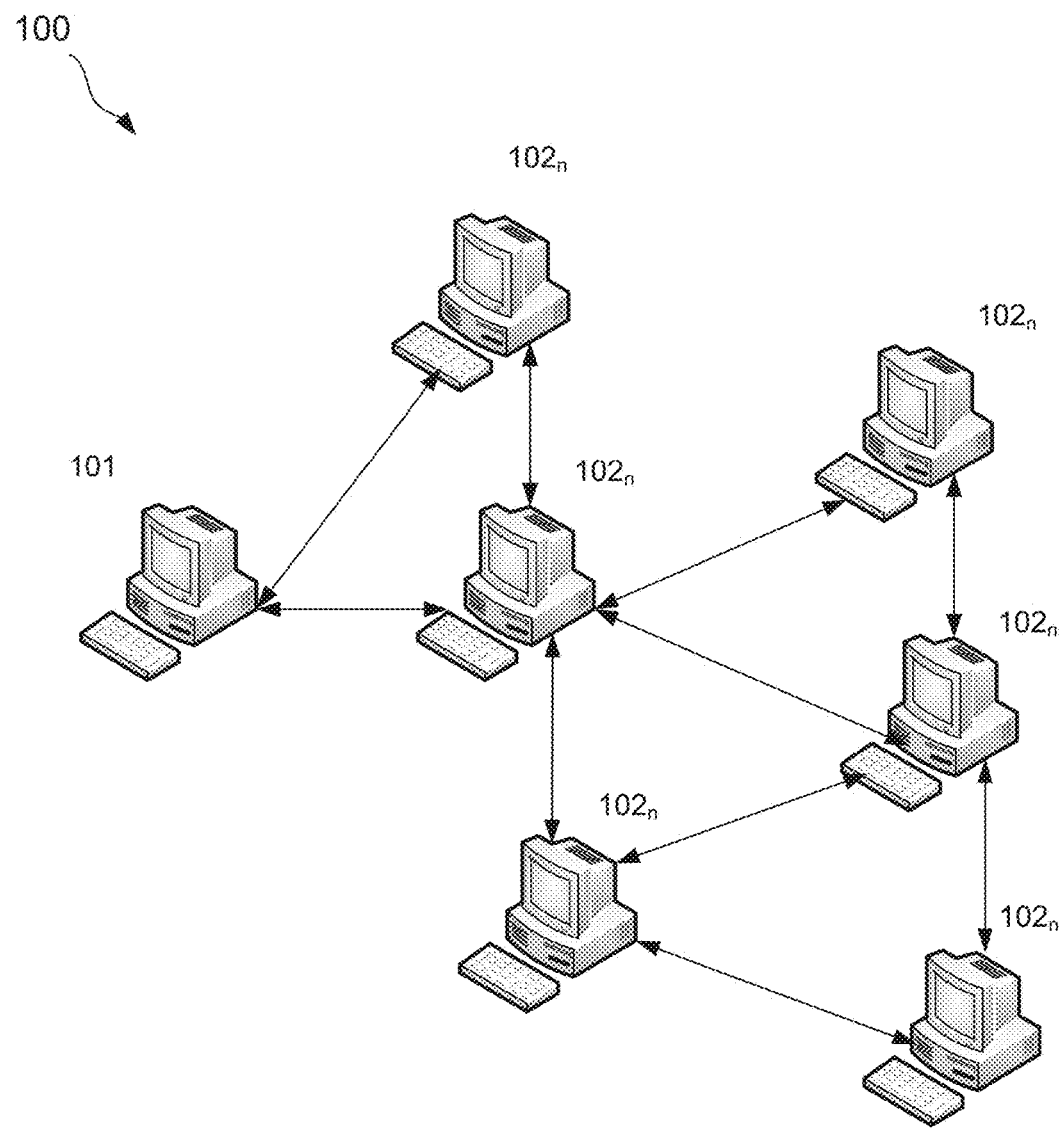
FIG. 1 depicts an exemplary network of computing resources in accordance with the present disclosure.

Although the following Detailed Description will proceed with reference being made to illustrative embodiments, many alternatives, modifications, and variations thereof will be apparent to those skilled in the art.

DETAILED DESCRIPTION

While the present disclosure is described herein with reference to illustrative embodiments for particular applications, it should be understood that such embodiments are exemplary only and that the invention as defined by the appended claims is not limited thereto. Those skilled in the relevant art(s) with access to the teachings provided herein will recognize additional modifications, applications, and embodiments within the scope of this disclosure, and additional fields in which embodiments of the present disclosure would be of utility.

Generally, the present disclosure provides methods, systems and devices for scheduling and executing trusted tasks with a multi-tenant (i.e., distributed) computer system that includes a distributed trusted execution environment (dTEE) and collecting the results thereof in a secure manner. As will be described in detail below, the methods, systems, and devices of the present disclosure can permit the execution of trusted tasks on a dTEE, wherein a TEE at each node protects security sensitive aspects of the data and/or code associated with the trusted task. In addition, the systems, methods, and devices of the present disclosure may maintain multi-level security and/or data compartmentalization semantics at each node in a dTEE, while mitigating the threat of malicious software.

The systems and methods of the present disclosure may be implemented using a plurality of devices that are connected to form a distributed computing system (DCS). As used herein, the terms "device" and "devices" refer individually and/or collectively to any of the large number of electronic devices that may communicate using a communications network and which may be leveraged as a "client" or a "service provider" (as defined below) in accordance with the present disclosure. Non-limiting examples of devices that may be used in accordance with the present disclosure include cell phones, computer terminals, desktop computers, electronic readers, facsimile machines, kiosks, netbook computers, notebook computers, internet devices, payment terminals, personal digital assistants, media players and/or recorders, set-top boxes, smart phones, tablet personal computers, ultra-mobile personal computers, wired telephones, combinations thereof, and the like. Such devices may be portable or stationary. Without limitation, the devices described herein are preferably in the form of one or more cell phones, desktop computers, laptop computers, smart phones and tablet personal computers. In the context of a DCS, the term "node" may be used to refer to one or more devices in the DCS.

The term "client" is used herein to refer to a device that initiates a trusted task. In contrast, the term "service provider" is used to refer to a device that performs one or more aspects of a trusted task on behalf of a client. It should be understood that the terms "client" and "service provider" are used herein for the sake of clarity only, and that any of the clients described herein may be capable of acting as a service provider, and vice versa.

In the FIGS., a subscript "n" is used in connection with numerical identifiers associated with one or more service providers that may be present in a distributed computing system consistent with the present disclosure. When used, it should be understood that the subscript n is a non-zero integer. Therefore, n may equal 1, 2, 3, 4 . . . 100 . . . 1000 . . . 10000 . . . or more, including all positive integer values above, below, and/or between the aforementioned numbers. Thus for example, the expression "service provider $X_n$" should be interpreted as indicating that one or a plurality of service provider X's can be present. Therefore while the present disclosure may refer to a service provider in the singular, e.g., service provider $X_n$, such expressions should be interpreted as also encompassing the plural form. Likewise, illustration in the FIGS. of multiple service providers should not be construed as indicating that multiple service providers are required, as systems and methods utilizing a single service provider are envisioned by the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously.

Individual devices (i.e., nodes) in the distributed computing systems described herein may be connected in any suitable fashion. For example, devices within a distributed computing system may be connected via one or more communications networks, i.e., via one or more systems for sending and/or receiving a data signal. Such communications networks may include close range communication, long range communication, and/or combinations thereof.

As used herein, the term "close range communication" means systems and methods for sending/receiving data signals between devices that are relatively close to one another. Close range communication includes, for example, communication between devices using a BLUETOOTH™ network, a personal area network (PAN), near field communication, a ZigBee network, an Ethernet connection between respective devices in a DCS, combinations thereof, and the like. Close range communication may therefore be understood as direct communication between devices, without the need for intervening hardware/systems such as routers, cell towers, internet service providers, and the like.

As noted previously, the trusted tasks described herein may include data and/or code that is/are subject to differing degrees of security. For example, some of the data and/or code may be classified secret, whereas other portions of the data/code may be classified top-secret, uncontrolled, and the like. Data/code classified in this manner is referred to herein as being subject to a multi-level security policy. Such data/code may also be associated with one or more different compartments, e.g., different departments of an organization. Data/code subject to such compartmentalization is referred to herein as being subject to a resource allocation policy.

FIG. 1 illustrates one non-limiting example of a distributed computing system including a plurality of devices that are connected using close range communication. As shown, DCS 100 includes client 101 and a plurality of service providers $102_n$. Client 101 and service providers $102_n$ may communicate with one another, either through direct communication between nodes (e.g., via an Ethernet cable connected between client 101 and a service provider $102_n$, and/or between two service providers $102_n$), or by relaying signals from a first node (e.g., client 101), through one or more second nodes (e.g., one of service providers $102_n$) to reach a destination node (e.g., another service provider $102_n$). Thus, FIG. 1 may be understood to describe a distributed computing system formed by a mesh network of client 101 and service providers $102_n$.

"Long range communication" is used herein to refer to systems and methods for sending/receiving data signals between devices that are a significant distance away from one another. Long range communication includes, for example, communication between devices using a WiFi network, a wide area network (WAN) (including but not limited to a cell phone network (3G, 4G, etc. and the like), the internet, telephony networks, combinations thereof, and the like.

Figure 2:
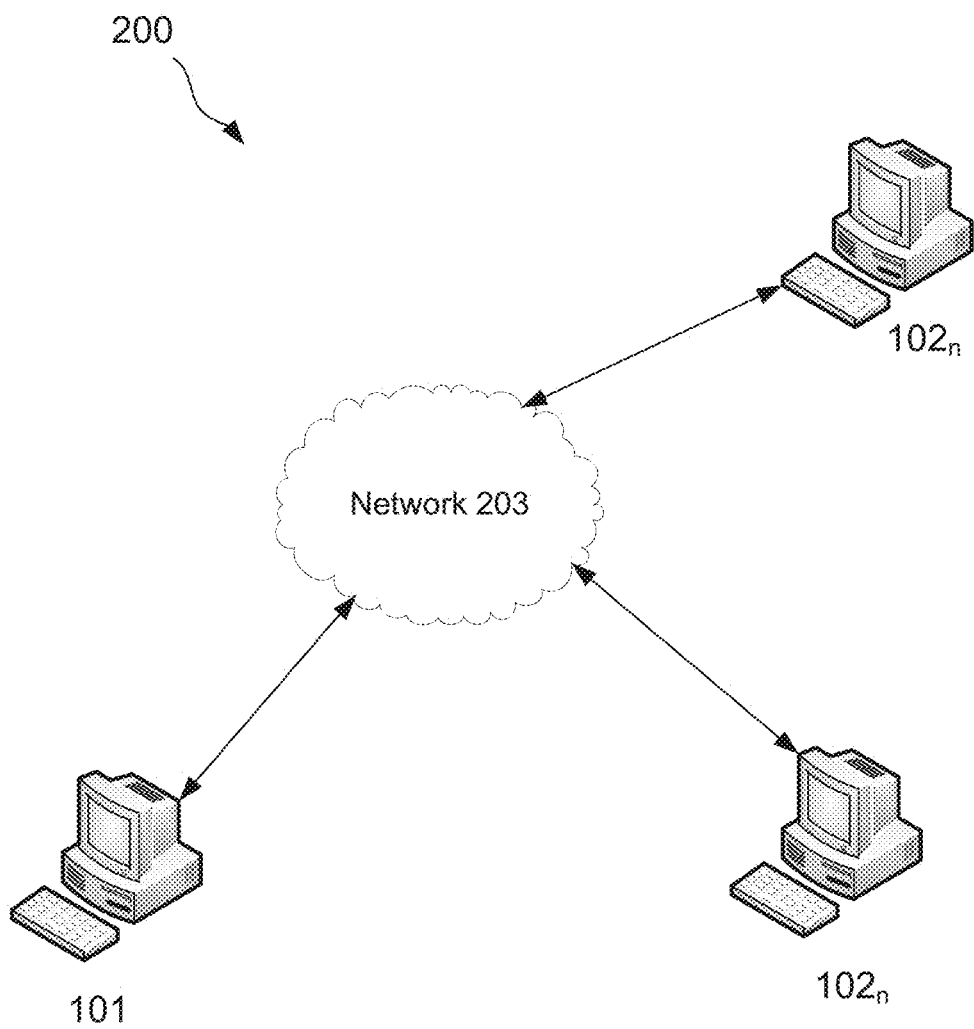
FIG. 2 depicts another exemplary network of computing resources in accordance with the present disclosure

FIG. 2 illustrates one non-limiting example of a distributed computing system utilizing long range communication between nodes. Like DCS 100 in FIG. 1, DCS 200 includes client 101 and a plurality of service providers $102_n$. As shown, client 101 and service providers $102_n$ may communicate with one another via network 103 using long range communication, as defined above.

Regardless of how they are connected, clients and/or service providers consistent with the present disclosure may be configured to provide one or more resources for executing one or more trusted computing tasks. For example, one or more of service providers $102_n$ in FIGS. 1 and 2 may be configured to provide a trusted execution environment (TEE) for the execution of all or a portion of a trusted task on behalf of client 101. As will be understood by those skilled in the art, a TEE is a secure environment that runs alongside an operating system and which provides secure services to that operating system. More information regarding TEE's and the implementation thereof may be found in the TEE client API specification v1.0, the TEE internal API specification v1.0, and the TEE system architecture v1.0 issued by GlobalPlatform, the entire contents of which are incorporated herein by reference. The term distributed TEE (dTEE) means a distributed computing system wherein each node provides a TEE, i.e., wherein a TEE is provided on at least two nodes such as on a client and at least one service provider, on multiple service providers, combinations thereof, and the like.

The clients and service providers described herein may include one or more of a trusted task initiation module (TTIM) and a trusted task execution module (TTEM) that are configured to permit the execution of trusted tasks on a distributed computing system. For example, the TTIM's described herein may permit a client to initiate the execution of a trusted task, evaluate the capabilities of potential service providers for that task, provision data and/or code to be operated on to qualified service providers, to receive the results of the executed task, and combinations thereof. Likewise, the TTEMs described herein may permit a service provider to receive a trusted task request from a client, attest the service providers secure execution capabilities to the client, receive data and/or code to be operated on from the client, provision such data and/or code in a trusted execution environment (optionally in accordance with a multi-level security policy and/or resource management policy), execute a trusted task on the data and/or code, provision the data for consumption/retrieval by the client, and combinations thereof. In addition, the TTIMs and TTEMs of the present disclosure may also be configured to provide a TEE to their respective client/service provider.

In some embodiments, the TTIMs and TTEMs described herein may permit a client and/or service provider to provide a TEE using one or more of virtualization technology, security co-processor technology, and secure enclave technology. Non-limiting examples of such technology include Intel™ VT-x virtualization technology, Intel™ VT-d virtualization technology, Intel™ trusted execution technology (TXT), converged security engine technology, converged security and manageability engine technology, a security co-processor, manageability engine, trusted platform module, platform trust technology, ARM TrustZone® technology, combinations thereof, and the like. The advantages and limitations of each of these technologies are well understood, and therefore are not described herein.

The clients and service providers described herein need not have the same configuration, either from a platform standpoint or a TEE standpoint. For example, a group of clients/service providers may include one or more cell phones, smart phones, desktop computers, tablet personal computers, and combinations thereof, which may each have their own TEE capabilities. That is, some of the client's/service providers in that group may be configured to provide a trusted environment via virtualization, such as with Intel™ VT-x technology, whereas others may be configured to provide a trusted execution environment with a secure enclave, a hardware module (e.g., a trusted platform module), combinations thereof, and the like.

Figure 3:
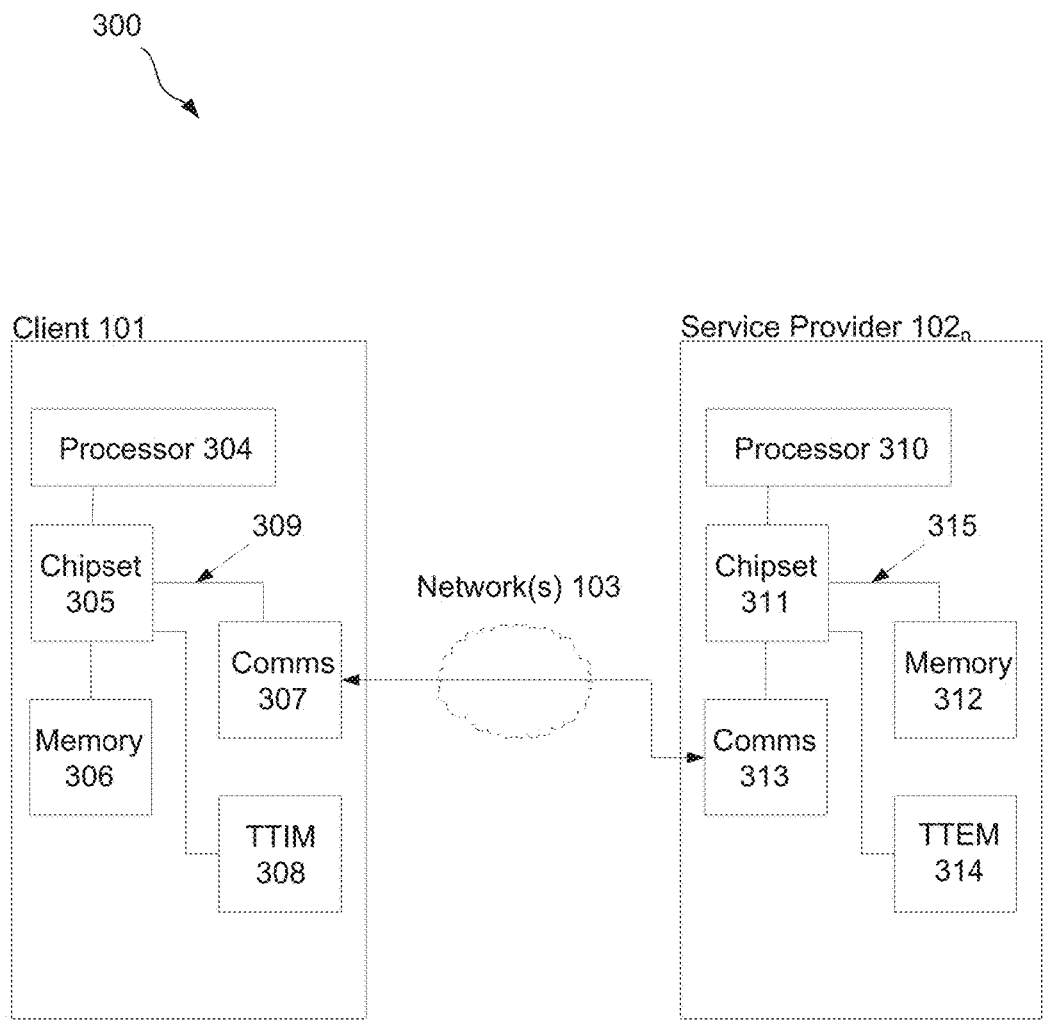
FIG. 3 is a block diagram of an exemplary system for performing secure operations with a distributed trusted execution environment (dTEE) in accordance with the present disclosure

One aspect of the present disclosure relates to a distributed computing system for the execution of trusted tasks issued by a client by one or more service providers in a distributed computing system. Reference is therefore made to FIG. 3, which illustrates an exemplary distributed computing system consistent with the present disclosure. DCS 300 includes client 101 and service provider $102_n$, which are connected to one another directly (e.g., through close range communication) or through optional network 103 (e.g., long range communication). Client 101 and service provider $102_n$ may be one or more devices, as defined above. For the sake of simplicity and ease of understanding, DCS 300 is illustrated as including a single client 101 and a single service provider $102_n$, which include many of the same general components. Specifically, client 101 and service provider $102_n$ each include a processor (i.e., processor 304/310), a chipset (i.e., chipset 305/311), a memory (i.e., memory 306/312), a communications interface ("Comms," i.e., Comms 307/313), wherein the chipset and other components are connected by a bus (i.e., bus 309/315). It should be understood however that any type and number of clients and service providers may be used, and that the configuration of each of those devices may differ.

Processors 304, 310 may be any suitable processor, including but not limited to general purpose processors and application specific integrated circuits. Such processors may be capable of executing one or multiple threads on one or multiple processor cores. Without limitation, processors 304, 310 are preferably general purpose processors, such as but not limited to the general purpose processors commercially available from Intel Corp. and Advanced Micro Devices (AMD).

Chipset 305, 311 may include circuitry that is appropriate for the platform of client 101 and service provider $102_n$, respectively. For example, where client 101 is a smart phone, chipset 305 may include circuitry suitable for a smart phone platform. In any case, circuitry within chipset 305 may include integrated circuit chips, such as but not limited integrated circuit chips commercially available from Intel Corp. Of course, other types of integrated circuit chips may also be used.

Memory 306, 312 may be any suitable type of computer readable memory. Examples of such memory include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, computer readable media may include other and/or later-developed types of computer-readable memory.

Communications interface (Comms) 307, 313 may include hardware (i.e., circuitry), software, or a combination of hardware and software that allows client 101 and service provider $102_n$ to communicate with one another via close and/or long range communication, e.g., using a predefined communications protocol. For example, Comms 307, 313 may include one or more transponders, antennas, BLUETOOTH™ chips, personal area network chips, near field communication chips, combinations thereof, and the like.

Client 101 further includes trusted task initiation module (TTIM) 308, and service provider 102n further includes trusted task execution module (TTEM) 314. For the sake of illustration, TTIM 308 and TTEM 314 are illustrated a separate components that are connected to chipset 305, 311 via bus 309, 315, respectively. The illustrated configuration may be suitable, for example, when TTIM 308 and TTEM 314 are in the form of a hardware module such as a security processor (e.g., trusted platform module, manageability engine, etc.). Of course, such configuration is exemplary only, and TTIM 308 and TTEM 314 may be respectively provisioned on client 101 and service provider $102_n$ in any suitable manner. Thus for example, one or both of TTIM 308 and TTEM 314 may be provisioned in the form of computer readable instructions that when executed by processor 304 cause client 101 and/or service provider $102_n$ to perform operations consistent with the present disclosure. In this regard, TTIM 308 and/or TTEM 314 may be provisioned within a memory, e.g., memory 306, memory local to processor 304, or another memory.

Client 101 may be configured to initiate the execution of a trusted task using resources with a distributed computer system, e.g., a TEE on service provider $102_n$. For example, TTIM 308 when executed by processor 304 may cause client 101 to transmit a trusted task initiation signal (TTIS, not shown) from client 101 to service provider $102_n$, e.g., from Comms 307 to Comms 313. In some embodiments, the TTIS may include a task certificate that contains a description of the data and/or code on which a secure operation is to be performed, as well as client defined criterion for the safe execution of the trusted task. For example, the TTIS may include a global policy (policy) that identifies the security and/or compartmentalization context imposed by a relevant multi-level security policy and/or resource allocation policy on the data and/or code under consideration. The TTIS may also specify the characteristics of trusted execution environments (TEEs) for the execution of the trusted task under consideration. For example, the signal from client 101 may specify the use of a TEE provided by virtualization, a hardware module (e.g., trusted platform module), a secure enclave, combinations thereof and the like. The TTIS may further specify the use of a TEE having certain processing resources, memory, storage, input/output resources, combinations thereof, and the like, which may be needed to execute the trusted task. Likewise, the TTIS may specify the use of a TEE that is capable of enforcing the security and/or compartmentalization context applicable to the data/code under consideration during the execution of the trusted task.

Service provider 102n may be configured to perform certain operations in response to receiving a TTIS from client 101. For example, TTEM 314 when executed by processor 310 may cause service provider to, in response to receiving a TTIS, send an attestation signal (AS) to client 101, e.g., from comms 313 to comms 307. The AS may include information that may affect client 101's decision to schedule the trusted task on service provider $102_n$ capabilities to the client. For example, the AS may include information attesting to the nature and type of TEE(s) on service provider $102_n$. In addition, the AS may include contextual information relevant to the trusted task. Non-limiting examples of such contextual information include the service provider's expected allocation of computing resources (processor, memory, input/output, storage, etc.), combinations thereof, and the like. Alternatively or additionally, contextual information in the AS may include context obtainable from one or more sensors, such as the location of service provider $102_n$ (e.g., obtained using a global positioning system), the mobility of service provider $102_n$ (e.g., from an accelerometer), power information (e.g., battery life), policies or Service Level Agreement (SLA) constraints.

Prior to sending an AS to client 101, service provider $102_n$ may initiate its TEE environment for the purpose of supporting the attestation process. More specifically, TEM 314 may cause service provider $102_n$ to instantiate enough of its TEE environment to support attestation, i.e., to support a representation to client 101 of its TEE capabilities.

In instances where a TTIS includes security and/or compartmentalization context, TEM 314 may cause service provider $102_n$ to instantiate containers/realms pertinent to such context. By way of example, if a TTIS specifies that data associated with a trusted task is subject to multi-level security policy that classifies some of the data as top secret, other data as sensitive, and still other data as unclassified, TEM 314 may cause service provider $102_n$ to initiate containers/realms in its TEE for each of the top secret data, the sensitive data, and the unclassified data. Each container/realm may be affiliated with associated resources, e.g., storage resources, processing resources, network resources, combinations thereof, and the like. Subsequently, TEM 314 may cause service provider $102_n$ to send an attestation signal to client 101 that includes information about the instantiated containers/realms. In some embodiments, the containers/realms are instantiated to a degree that is sufficient to allow attestation to the client of the service provider's ability to maintain such containers/realms in a TEE.

Client 101 may evaluate the capabilities of Service Provider $102_n$ based on the content of the AS. More specifically, TTIM 308 when executed by processor 304 may cause client 101 to analyze information in the AS from service provider $102_n$, e.g., against the criterion specified in the TTIS. If service provider $102_n$ lacks adequate capabilities for the execution of the trusted task, client 101 may seek another node (i.e., another service provider) for the execution of the task. This process may repeat until a suitable service provider is located. Alternatively or additionally, client 101 may revise the criterion specified in the TTIS, and evaluate the capabilities of service provider $102_n$ based on the revised criterion.

If service provider $102_n$ has adequate capabilities for execution of the trusted task, client 100 may schedule the trusted task for execution on service provider $102_n$. That is, TTIM 308 when executed may, upon determining that service provider $102_n$ has adequate capabilities for the execution of a trusted task, cause client 101 to schedule the trusted task for execution on service provider $102_n$. Scheduling the task may include transmitting the task and associated data, code and/or contextual information from client 101 to service provider $102_n$. In response, the service provider may allocate the data, code, etc. to respective compartments/realms in accordance with a multi-level security policy and/or resource allocation policy applicable to the data and/or code. That is, TEM 314 when executed by processor 310 may cause service provider, in response to receiving a scheduled task from client 101, to instantiate the data/code associated with the scheduled task within the respective containers/realms that were previously provisioned by service provider $102_n$. Execution of the trusted task may then proceed on the data/code in their respective containers. In this way, the security and containerization of the data/code may be maintained by the service provider throughout execution of the trusted task.

Subsequently, the results of the trusted task may be provisioned by service provider $102_n$ to client 101. In this regard, TEM 314 when executed by processor 310 may cause service provider $102_n$ to output the results of the trusted task while maintaining the security and/or compartmentalization context imposed by a relevant multi-level security policy and/or resource management policy. TEM 314 may then cause service provider $102_n$ to transmit the results to client 101. Alternatively or additionally, client 101 may securely access and retrieve the results from service provider $102_n$ Another aspect of the present disclosure relates to methods for scheduling, executing, and/or collecting the results of a trusted task on a distributed TEE, wherein security context and/or compartmentalization context imposed by a multi-level security policy and/or resource allocation policy is/are maintained. In this regard, reference is made to FIGS. 4A-4E, which provide a flow diagram of exemplary operations in a method in accordance with the present disclosure. For simplicity, the following description of the methods of the present disclosure will proceed in the context of a non-limiting use case in which a client schedules a trusted task for execution on the TEE of a single service provider, e.g., as shown in FIG. 3. As noted above, however, the present disclosure encompasses embodiments wherein a client may provision a trusted task on multiple service providers. It should therefore be understood that the following description applies to such embodiments, even though it focuses on the scheduling of a trusted task on the TEE of a single service provider.

Figure 4A:
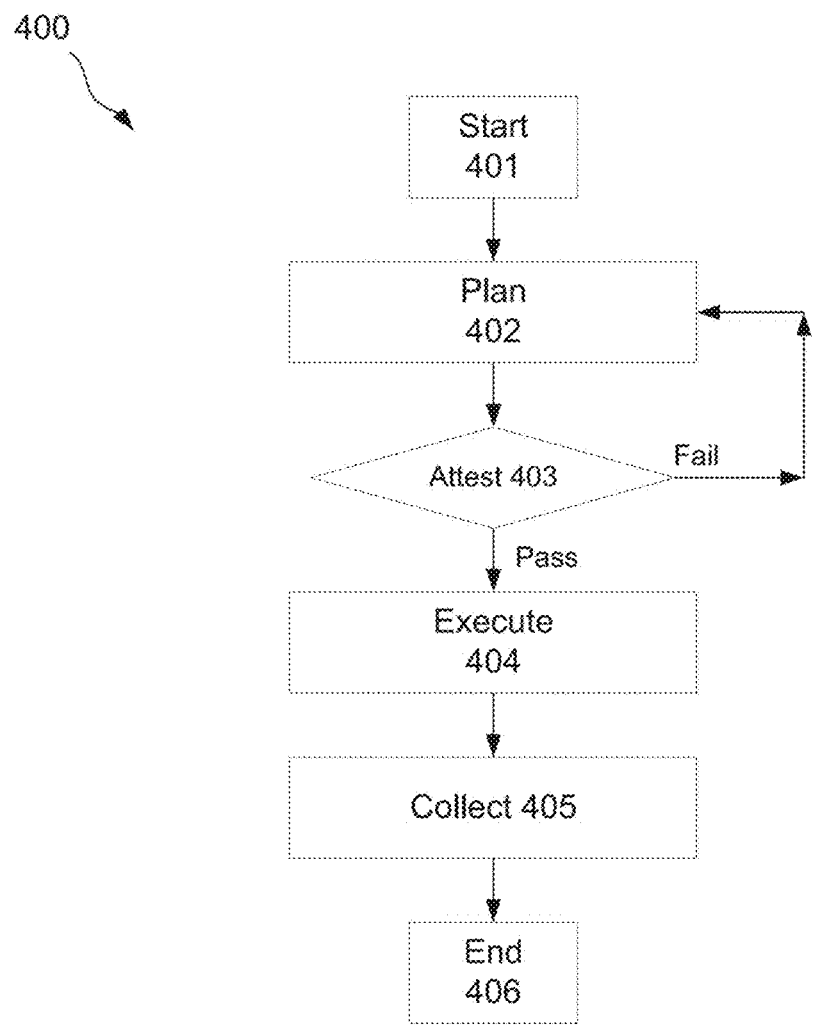
FIGS. 4A-4E depict flow diagrams of an exemplary method of performing secure operations with a dTEE, in accordance with the present disclosure.

As shown in FIG. 4A, method 400 starts at block 401. At plan block 402, a client plans for the execution of a trusted task on a remote TEE, i.e., a TEE provided on a remote service provider. The method then proceeds to attest block 403, wherein a service provider attests to its trusted execution capabilities. If attestation fails, the method returns to start block 401, whereupon the execution parameters specified by the client are changed, and/or another service provider is queried. If attestation succeeds, the method proceeds to execute block 404, wherein the client allocates the trusted task to the service provider, and the service provider performs the task in its TEE. The method then proceeds to collect block 405, wherein the results of the trusted task are provisioned to the client.

Figure 4B:
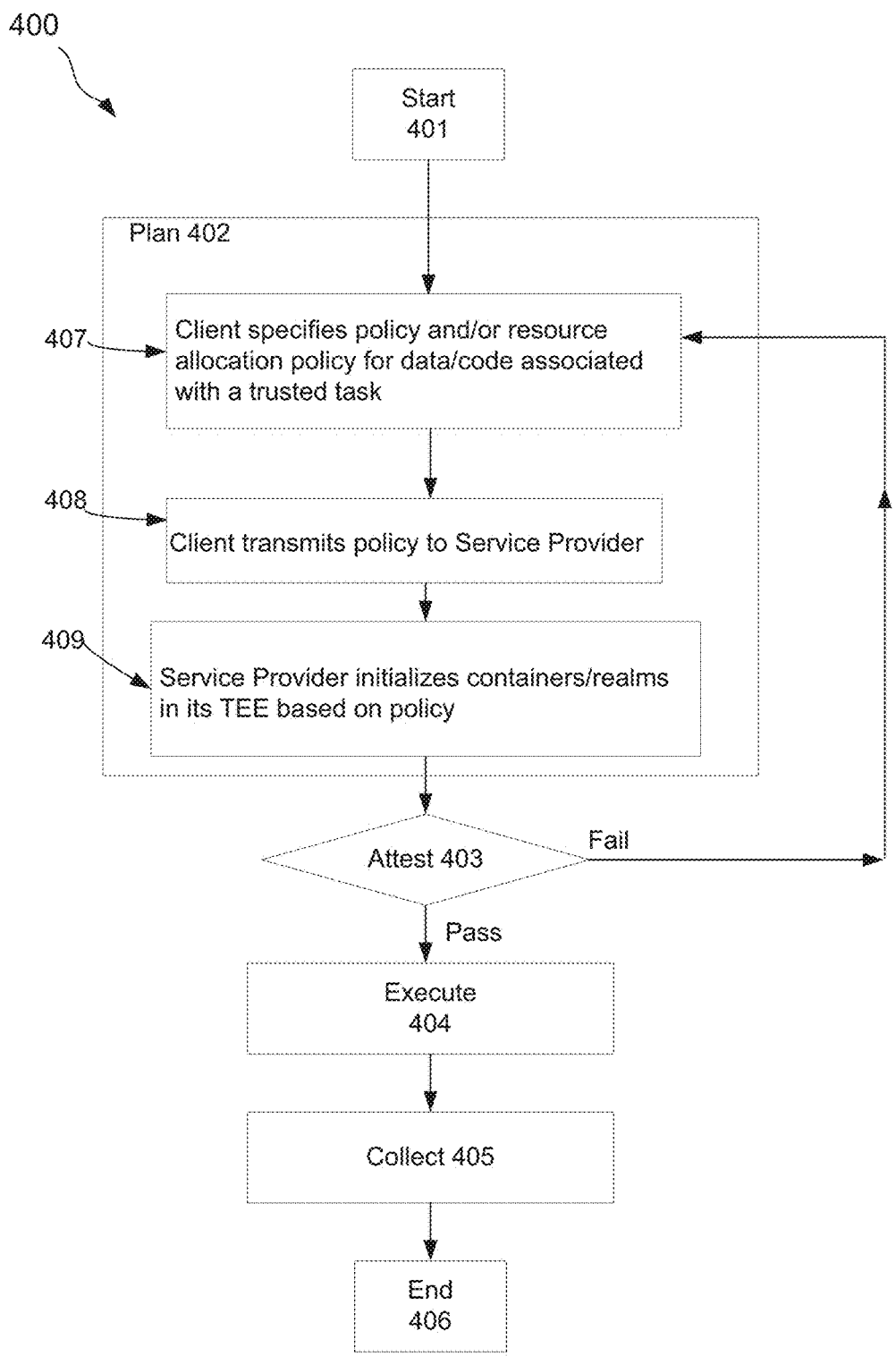

FIG. 4B is a flow diagram illustrating in further detail exemplary operations that may be performed in block 402 of FIG. 4A. As shown, the operations in plan block 402 may begin with block 407, wherein a client may specify a policy for data and/or code that is associated with a trusted task that the client wishes to have performed. The policy may include security and/or compartmentalization context, as previously described. This context may be based on limitations imposed by a multi-level security policy and/or resource allocation policy that apply to all or a portion of the data/code that will be operated on by the trusted task.

In addition, the policy may include at least one criterion that defines a TEE that the client may find acceptable for the execution of a trusted task on the data/code in question. Such criterion may differ depending on the sensitivity and/or compartmentalization of the data in question. For example, a client may specify parameters defining a highly secure TEE for the execution of trusted operations on top secret data/code (e.g., where data confidentiality may be protected with 256-bit equivalent strength encryption), whereas it may specify parameters of a less secure TEE for the execution of trusted operations on less sensitive or unclassified data/code (e.g., where data confidentiality may be protected with 128-bit equivalent strength encryption).

As will be discussed below, the client may reject service providers that are unable to meet the criterion specified in the policy. As will also be described later, the client in block 402 may also take steps to initiate the protection of the data/code that is will be the subject of the trusted task. For example, the client may generate one or more encryption keys for each data compartment (i.e., security level and/or other compartmentalized organization), one or more shared keys, combinations thereof, and the like.

The method may then proceed to block 408, wherein a client transmits a trusted task initiation signal (TTIS) to a service provider. The TTIS may include a copy of the policy generated by the client for the data/code in question. The TTIS may also include one or more key exchange keys, encryption keys, a private client ID, combinations thereof, and the like, as will be described later.

The method then proceeds to block 409 wherein, in response to receiving a TTIS, a service provider initializes containers in its TEE that correspond to security context/compartmentalization specified by the client for the data/code in question. In some embodiments, the service provider instantiates containers with its TEE to a degree that is sufficient to support attestation of the service provider's TEE capabilities to the client. The method may then proceed to attest block 403, which is described in detail below with reference to FIG. 4C.

Figure 4C:
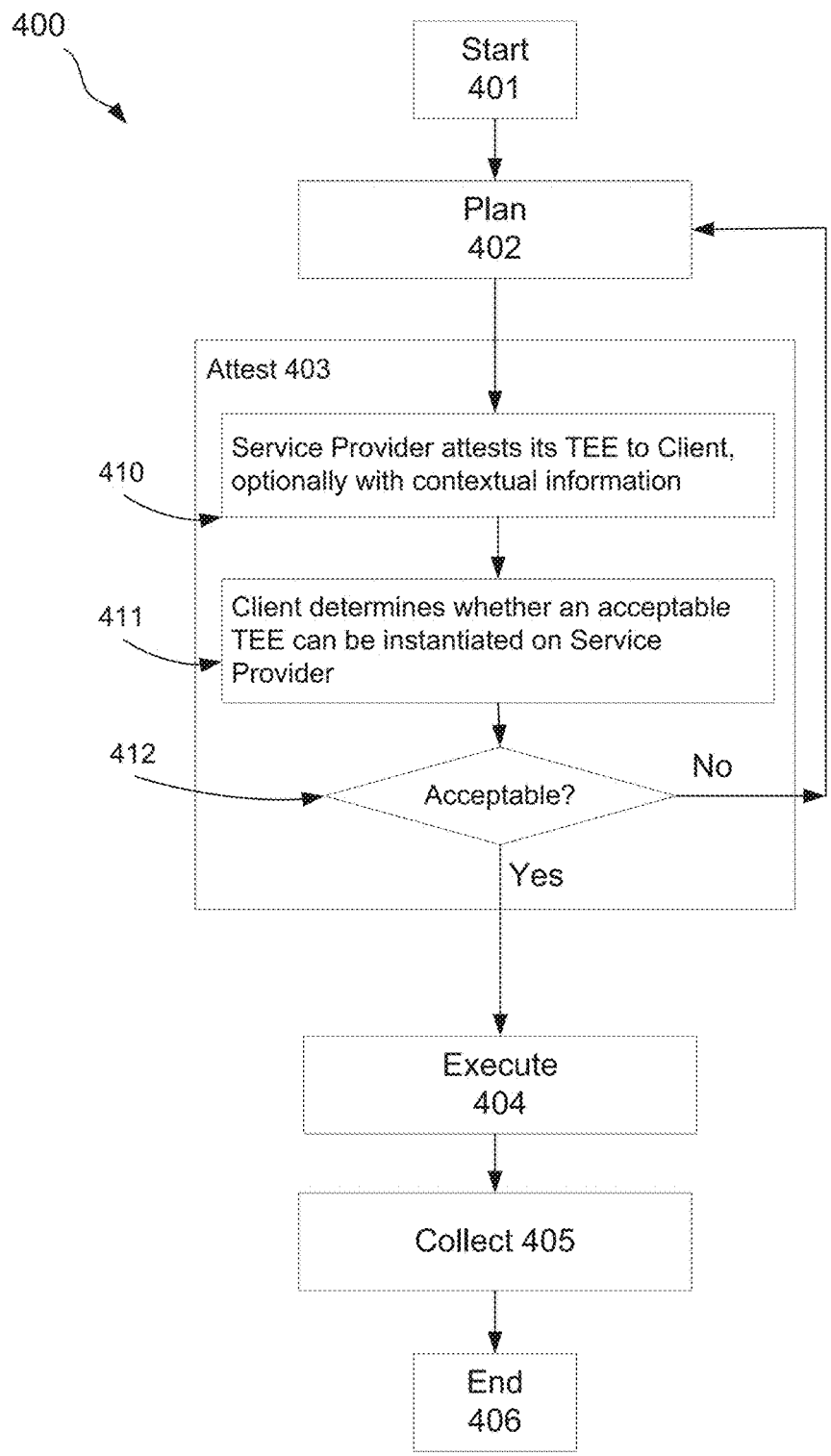

FIG. 4C is a flow diagram that provides further details with respect to operations that may be performed in attest block 403 of FIG. 4A. Once a service provider receives a TTIS, it may attest its TEE environment to a client. Attestation may occur using any suitable attestation protocol, such as remote attestation, a Sigma (i.e., sign and message authentication code (MAC) protocol), combinations thereof, and the like. One example of a suitable Sigma protocol that may be used is the modified Sigma protocol described in "SIGMA, the Sign-and-Mac Approach to Authenticated Diffie-Hellman and its Use in the IKE protocol," Hugo Krawczyk, Proceedings of Crypto 2003, Springer-Verlag Lecture Notes in Computer Science No. 2729, p. 399, the entire content of which is incorporated herein by reference. In any case, during block 410 the service provider may evaluate the criterion specified in the TTIS and determine whether it can meet such criterion. If it can, the service provider may send an attestation signal to the client that contains an attestation proof of its TEE, thus indicating that it has the resources desired by the client for the execution of the trusted task. If it cannot, the service provider may send an attestation signal to the client that includes attestation proof proposing alternative criterion for the execution of the trusted task, e.g., criterion of the TEE environment that the service provider can offer.

In addition to attesting its TEE to the client, the service provider may optionally provide contextual information to the client which may affect whether the client will consider the service provider is considered suitable for execution of the trusted task, as described previously in connection with the description of service provider $102_n$ in FIG. 3. Such contextual information may be transmitted by the service provider with the attestation signal, in another signal, or a combination thereof.

Figure 4D:
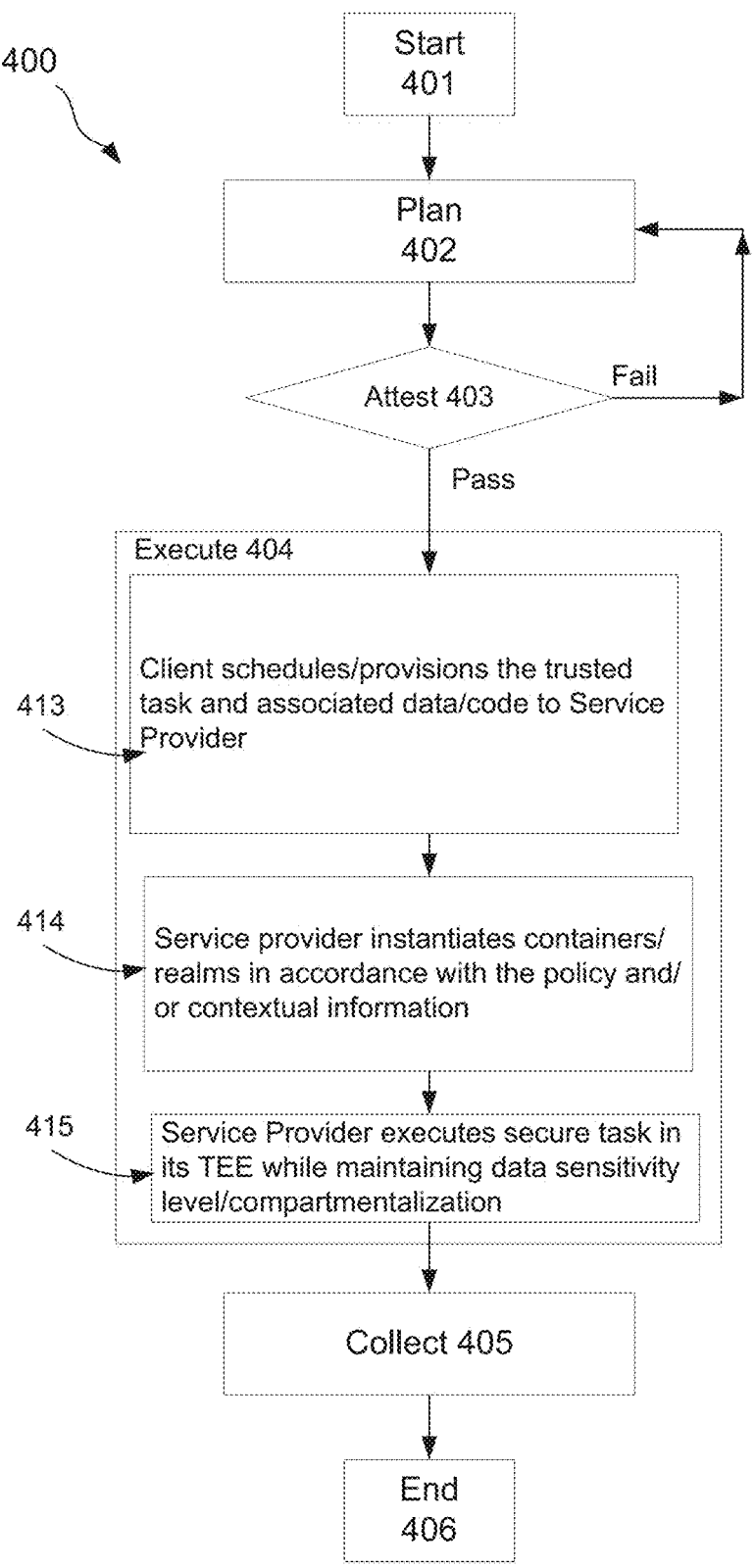
Figure 4E:
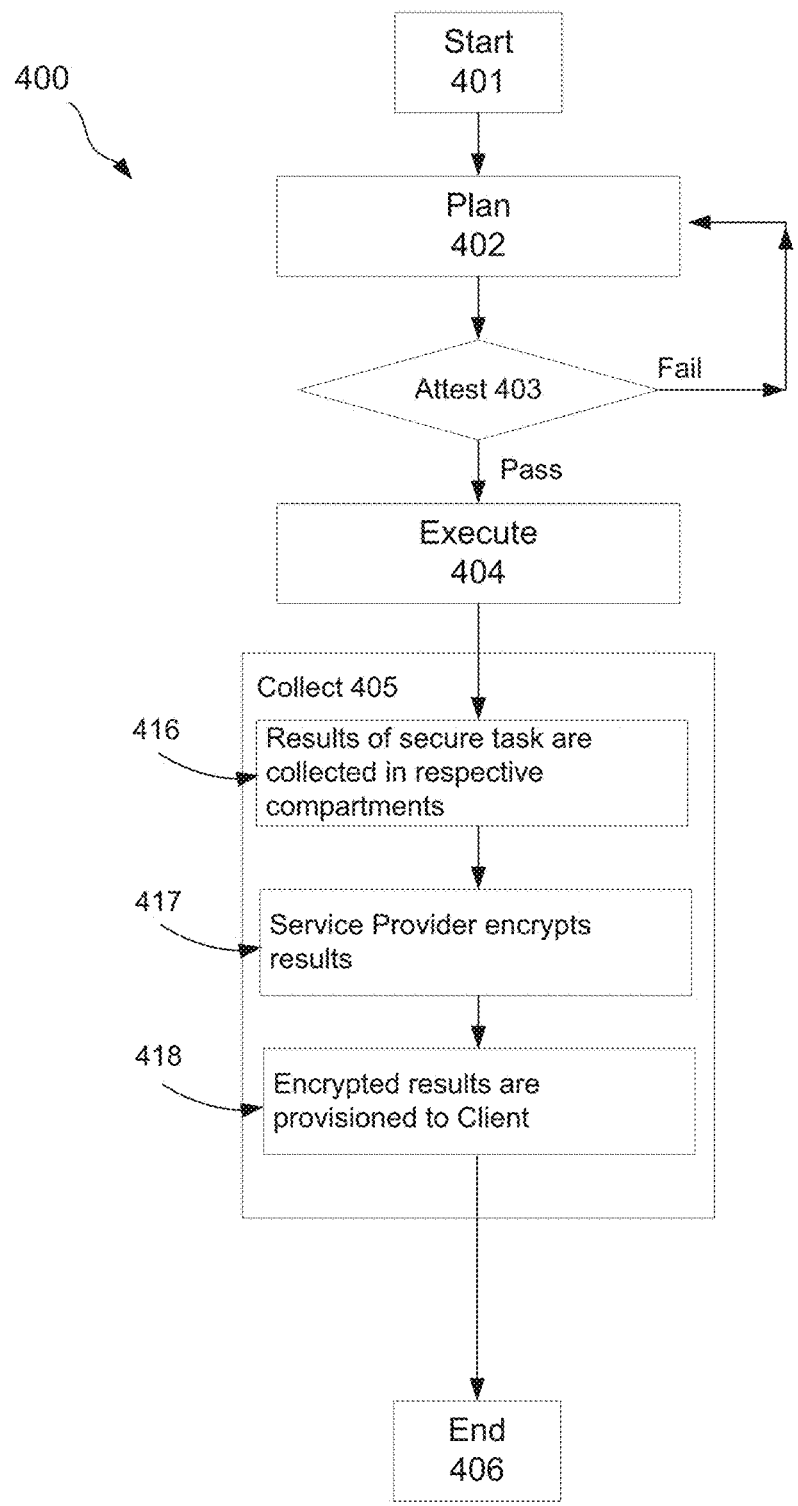

The method may then proceed to block 411, wherein the client analyzes the attestation proof offered by the service provider and determines whether an acceptable TEE can be instantiated on the service provider. If not, the method may return to plan block 402 (as shown in block 412), wherein the client may query other service providers based on the existing criterion, and/or specify new criterion for the execution of the trusted task. Once an acceptable service provider is found, the method may proceed to execute block 404, exemplary operations of which are illustrated in FIG. 4D.

As implied by the foregoing, operations in execute block 404 are generally directed towards the actual execution of a trusted operation by a service provider on data/code provisioned by a client. This is highlighted in the embodiment of FIG. 4D, wherein at block 413 the client schedules/provisions the trusted task and associated data/code to the service provider for execution. Among other things, such scheduling/provisioning may include transmitting the task and associated data/code to a service provider, along with the parameters specified by any multi-level security policy and/or resource allocation policy applicable to the associated data/code. As will be described later, the client may encrypt the data/code for each compartment (e.g., secret, top secret, etc.) with a respective encryption key, prior to transmitting it to the service provider.

In any case, the method may proceed to block 414, wherein the service provider instantiates containers/realms that are populated with data/code according to the parameters/criteria specified by the client, e.g., in a relevant multi-level security policy and/or a resource allocation policy. Thus for example, if the client specifies that certain data is classified whereas other data is uncontrolled, service provider will instantiate a container/realm for the classified data, and a container/realm for the uncontrolled data, and populate each of such containers/realm with the relevant data. If the data/code received by the service provider is encrypted, the service provider may decrypt such data/code when it is instantiated in the appropriate container. That is, top-secret data/code may be decrypted when it is instantiated in a compartment within the service provider's TEE for top-secret information. Likewise, sensitive data/code may be decrypted when it is instantiated in a compartment within the service provider's TEE for sensitive data. In this way, the methods described herein can preserve the data sensitivity and/or compartmentalization context during execution of a trusted task, which occurs in block 415. The method may then proceed to collect block 405, exemplary operations of which are illustrated ion FIG. 4E and described below.

The operations of collect block 405 are generally drawn to provisioning the results of a trusted task to a client in a secure manner, and in such a way as to preserve the data sensitivity and/or compartmentalization context applicable to the data/code associated with the trusted task. In this regard, at block 416 the results of an executed task are collected by the service provider in respective compartments/realms. I.e., results of operations on top secret data are collected in one compartment/realm in service provider's TEE, whereas the results of operations on uncontrolled data are collected in another compartment/realm. The method may then proceed to block 417, wherein the data in each compartment/realm is encrypted by the service provider. At block 418, the encrypted results are provisioned to the client, which can decrypt the encrypted results with one or more keys.

As may be understood from the foregoing, the systems and methods of the present disclosure may permit the execution of trusted tasks initiated by a client within a trusted execution environment on a remote TEE, while retaining security and/or compartmentalization context of the data/code operated on by the task. While maintaining the security and/or compartmentalization context may be independently useful, the present disclosure further envisions systems and methods wherein data/code that is the subject of a trusted task may be protected as the task is executed on a distributed TEE. Accordingly, another aspect of the present disclosure relates to key management and encryption methodologies that support the protection of data/code during the execution of a trusted task on a distributed TEE.

Figure 5:
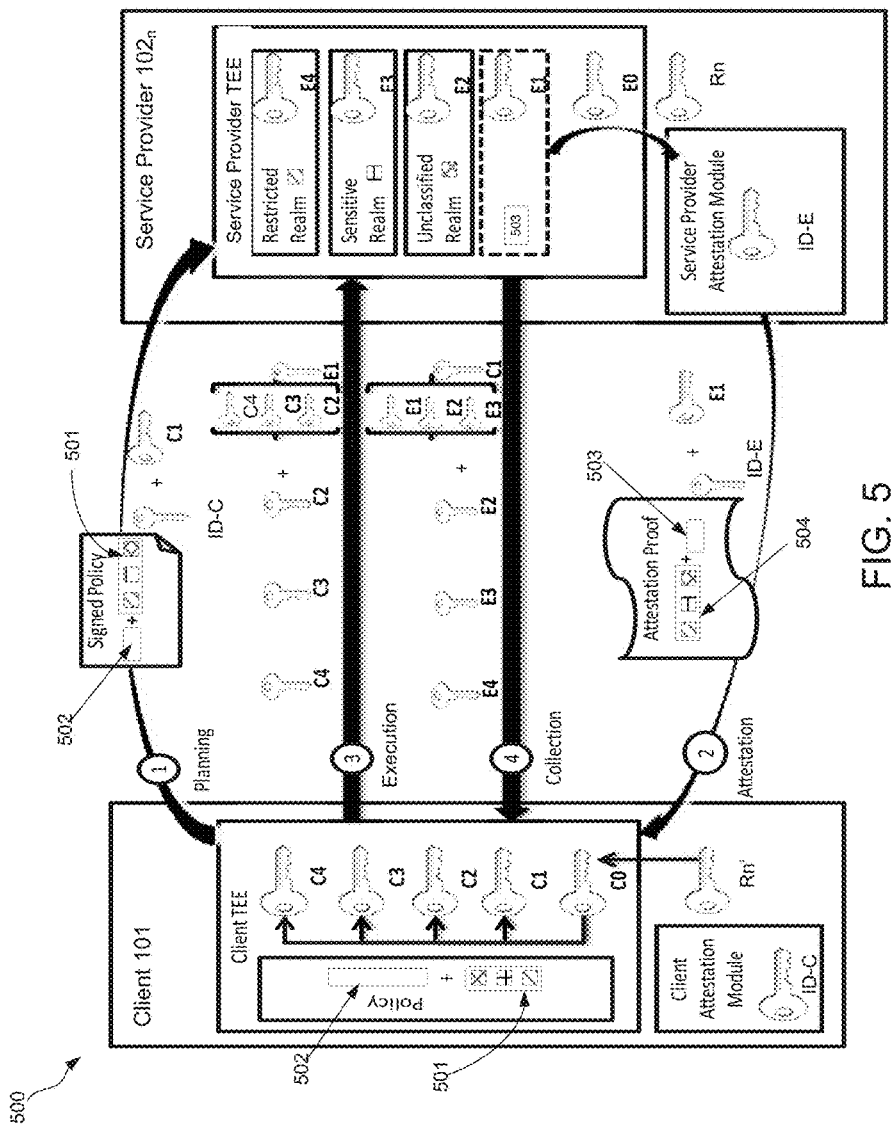
FIG. 5 illustrates an exemplary system/method for managing key flow during the execution of secure operations with a dTEE, in accordance with the present disclosure.
Figure 6:
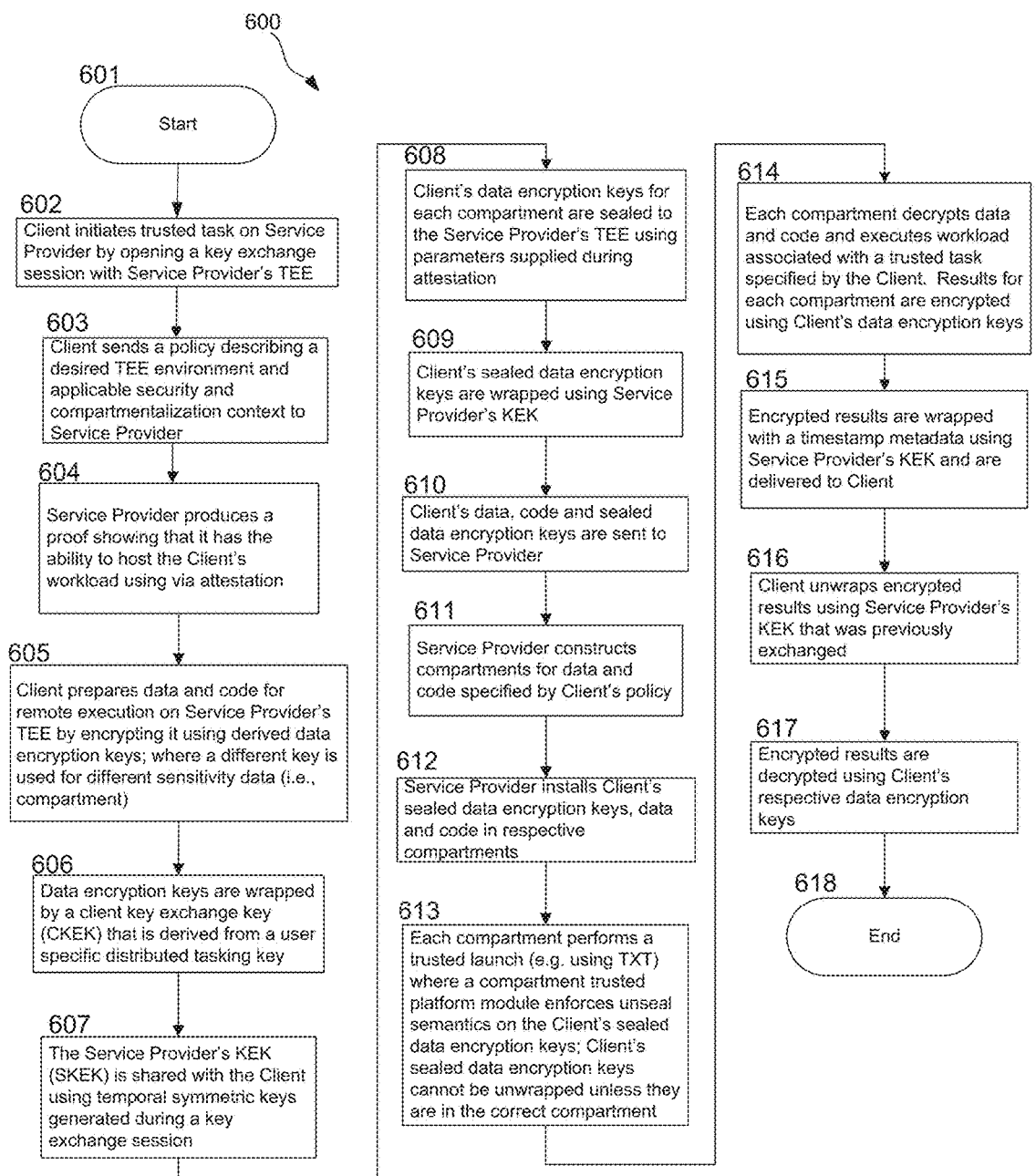
FIG. 6 depicts a flow diagram of another exemplary method of performing secure operations with a dTEE in accordance with the present disclosure.

In this regard, reference is made to FIGS. 5 and 6, which depict an exemplary system and method, respectively, for managing key flow during the execution of trusted operations with a dTEE, in accordance with the present disclosure. As shown, system 500 principally performs four steps (1, 2, 3 and 4) in the course of executing a trusted task. As will become evident from the following discussion, steps 1, 2, 3, and 4 in FIG. 5 correlate to the plan, attest, execute, and collect steps discussed previously in connection with FIGS. 4A-4E. The discussion of FIG. 5 therefore focuses on the generation and management of encryption keys that may be used to protect the data/code that is the subject of a trusted task, as well as the communicative exchanges that may occur between a client and service provider.

At step 1, client 101 authors a policy (using its TEE) that specifies compartmentalization rules 501 (represented by boxes filled with different hash marks) for data/code associated with a trusted task, as well as criterion 502 that define acceptable TEE environments for the execution of the trusted task. Encryption keys for each data compartment are then derived by the client using an acceptable key derivation function. For example, keys for each data compartment (e.g., C2, C3, C4) may be derived using a key derivation function of the form:

KDF (Cx)=CMAC ("Level_x", SessionID, C0)

Where KDF means key derivation function, Cx is the encryption key for data of Level_x (e.g., C2, C3, C4, etc.), CMAC is an advanced encryption system (AES/Rijndael) symmetric cipher based message authentication code, the x in "Level_x" disambiguates a compartment, the Session ID is a nonce which may ensure that Cx is unique to a particular session, and C0 is the client's user specific distribution tasking key.

C0 may be derived from a local TEE for key derivation, such as a hardware security module, a security element, CPU microcode, and the like. For example, C0 may be derived using the key derivation function of the form:

KDF (C0)=CMAC ("User_A_dTee_master_key," Rn')

where Rn' is an entropic value, such as a hardware or software derived entropic value. E0 in FIG. 5 is service provider 102$_n$'s user specific distributed tasking key, which may be derived in much the same manner as C0 described above, except that Rn is used as an entropic value instead of Rn'.

In addition, client 101 may derive a key exchange key (C1) using an acceptable key derivation function. For example, the client may derive C1 using a function of the form:

KDF (C1)=CMAC("Key_exchange_key", SessionID, C0)

where CMAC, SessionID, and C0 are as previously described. It should be understood that SessionID in KDF (C1) differs from SessionID in KDF(C0).

Once C0, C1, and an encryption key for each compartment are generated, client 101 may sign the policy containing the security/compartmentalization context and the criterion for acceptable TEE with a private key, illustrated in FIG. 5 as ID-C. As examples of suitable private keys that may be used as ID-C, mention is made of keys that are suitable for use with secure enclaves (e.g., enhanced privacy identification (EPID) keys), virtualization technology and/or trusted platform module technology (e.g., attestation identity keys (AIK)), combinations thereof, and the like.

In either case, client 101 may generate private key ID-C, and/or private key ID-C may have been provisioned in client 101's hardware at the time it was constructed. Regardless, a corresponding attestation key may be provisioned to each node of the distributed computing system (e.g., on client 101 and service provider 102$_n$). For example, wherein ID-C is an EPID private key, the corresponding attestation key may be in the form of an EPID public key, which may have been provided to each node (i.e., client 101, service provider 102$_n$) at the time such nodes were manufactured. Alternatively, wherein ID-C is an attestation identity key (AIK) such as those used in connection with a trusted platform module, the corresponding attestation key may be an AIK issued by a trusted third party, and which vouches for the validity of the policy issued by the client.

A TEE on client 101 may access ID-C at any time via an attestation module, illustrated in FIG. 5 as a client attestation module. The configuration of the client attestation module may differ depending on the type of TEE client 101 can provide, as well as the nature of ID-C. For example, in instances where the client TEE is in the form of a secure enclave, ID-C may be an EPID private key. In such instances, the client attestation module may be the in form of an attestation enclave. Alternatively, where client 101 provides a TEE via virtualization, ID-C may be an attestation identification key (AIK), and client attestation module may be in the form of a hardware security module, such as a trusted platform module(TPM) as defined by the Trusted Computing Group in the TPM main specification level 2, version 1.2 revision 116 (March 2011).

In any case, client 101 may then transmit the policy (signed by ID-C) and its key exchange key C1 to service provider 102$_n$. Transmission of key exchange key C1 may occur in a secure manner, such as with the use of temporal session keys. For example, client 101 may transmit key exchange key C1 to service provider 102$_n$ using a sign and mac (Sigma) protocol, direct anonymous attestation (DAA), transport layer security (TLS) authentication combinations thereof, and the like.

Service provider 102$_n$ may verify the authenticity of the client policy using ID-C. For example, where ID-C is an EPID private key, service provider 102$_n$ may determine upon inspection that it was issued by a legitimate client TEE, without revealing the identity of client 101. Alternatively, where ID-C is an AIK, service provider 102$_n$ can verify the authenticity of the client policy using a trusted third party, who can attest to the legitimacy of client 101.

At step 2, service provider 102$_n$ may evaluate the client policy to determine whether the policy constraints may be met by the service provider's TEE. As part of this evaluation, service provider 102$_n$ may initiate containers/realms in accordance with the security and/or compartmentalization context in the policy. This is illustrated in FIG. 5, wherein service provider 102$_n$ is illustrated as having initiated a restricted realm, a sensitive realm, and an unclassified realm corresponding to the data security classifications in the signed policy transmitted by client 101.

If the constraints of the client policy can be met, the service provider 102$_n$ may transmit an attestation proof to client 101 that acknowledges the policy's feasibility. In some embodiments, the attestation proof includes a description of the realms/containers that were initiated by the service provider's TEE, illustrated in FIG. 5 as box 504 with containers of different hashed fills. The attestation proof may also include a description 503 of other aspects of the service provider's TEE. Such description may report the capabilities of service provider 102$_n$'s TEE relative to the criterion 502 specified in the client policy.

Alternatively, if the policy cannot be satisfied, an alternative policy may be constructed and/or the service provider 102$_n$ may transmit an attestation proof to client 101 that attests to the actual capabilities of its TEE. In any case, the service provider 102$_n$ may sign its attestation proof with in appropriate private key, e.g., ID-E, if it wishes to remain anonymous. Like ID-C, the nature of ID-E may vary depending on the TEE capabilities of service provider 102$_n$. For example, where service provider 102$_n$'s TEE is configured to use secure enclave, ID-E may be the private EPID of service provider 102$_n$. Likewise if service provider 102$_n$ is equipped to provide a TEE using virtualization (as in the case of a trusted platform module), ID-E may take the form of an AIK.

Like client 101's TEE, service provider 102$_n$'s TEE may access ID-E at any time using an attestation module, shown in FIG. 5 as service provider attestation module. The configuration of the service provider attestation module may differ depending on the type of TEE service provider 102$_n$ can provide, as well as the nature of ID-E. For example, in instances where the service provider TEE is in the form of a secure enclave, ID-E may be an EPID private key. In such instances, the service provider attestation module may be the in form of an attestation enclave. Alternatively, where service provider 102$_n$ provides a TEE via virtualization, ID-E may be an attestation identification key, and client attestation module may be in the form of a hardware security module such as a trusted platform module.

In addition, service provider 102$_n$ may transmit its service provider node key exchange key E1 to client 101 in a secure manner. For example, service provider 102$_n$ may encrypt E1 prior to its transmission to client 101. For example, where E1 is transferred to client 101 using the Sigma protocol, it may be encrypted using one or more Sigma session keys.

The exchange of key exchange keys between client 101 and service provider 102$_n$ may be based on the trust each node's TEE has in the client policy describing the desired TEE environment and the attestation proof describing the TEE capabilities of service provider 102$_n$. Thus, client 101 may trust service provider 102$_n$'s TEE to protect its key exchange key C1 from access by unauthorized third parties. Likewise, service provider 102$_n$ may trust client 101's TEE to protect its key exchange key E1 from access by unauthorized third parties.

In any case, the opposing key exchange keys (i.e., C1, E1) may be stored within the context of a respective node so that steps 1 and 2 may be omitted if subsequent interaction between client 101 and service provider 102$_n$ is desired. For example, client 101 may store the relationship of its user specific distributed tasking key C0 with E1 of service provider 102$_n$ in its context. In this way, client 101 may maintain trust relationships with one or more distributed TEE environments, e.g., by wrapping the key exchange key of each service provider with its user specific distributed tasking key C0. Other nodes (e.g., service providers 102$_n$) may establish n-way trust relationships with each other in a similar fashion.

Steps 1 and 2 may be conducted over the same key exchange session (e.g., the same Sigma session) or client 101 and service provider 102$_n$ may negotiate separate key exchange (e.g., Sigma) sessions for each of steps 1 and 2. For example, it was previously explained that a data encryption key (Cx) for data of level X may be derived using KDF ((Cx)=CMAC ("Level_x", SessionID, C0)), where the SessionID is a nonce which may ensure that Cx is unique to a particular session. As may be appreciated, SessionID may be used as an identifier that relates a client to a service provider, and vice versa. For example, SessionID may be associated with an attestation from a service provider by including a domain or "group" name for the service provider in the Sigma "basename" parameter, where "basename" is used as the SessionID value. In a similar manner, the SessionID may be associated with a TTIS transmitted from a client. In either case, a Sigma session may be made more temporal by appending a counter value to the basename (e.g., SessionID=CMAC(basename, counter). In this way, the client and service provider may identify their pairing relationship.

In instances where the same key exchange (e.g., Sigma) session is used for steps 1 and 2 (and/or 3 and 4), one or more parameters of the relevant key exchange protocol may be substituted accordingly. For example, the Sigma protocol may be modified to substitute an EPIDCERT parameter for the standard CERT_ver parameter. As may be understood, CERT_ver is a certificate of a verifier that a provider uses to authenticate the verifier. EPIDCERT is a certificate issued by a TEE manufacturer (e.g., Intel) to allow a Verifier to check the authenticity of an EPID (or other) key.

At step 3, client 101 evaluates the attestation proof offered by service provider $102_n$. If client 101 determines that service provider $102_n$ has adequate TEE resources for the execution of the trusted task in question, it may schedule the trusted task for execution on service provider $102_n$'s TEE. More specifically, client 101 may encrypt compartmentalized data using a respective compartment key. For example, key C2 may be used to encrypt security level 2 data, C3 may be used to encrypt level 3 data, and so on. In addition, compartment keys for each data compartment (e.g., C2, C3, C4) may be wrapped with the service provider's key exchange key (i.e., E1). The encrypted data compartments and wrapped data compartment keys are then transmitted from client 101's TEE to service provider $102_n$'s TEE.

Subsequently, service provider $102_n$ unwraps the wrapped compartment keys using its key exchange key E1, thus obtaining compartment keys C2-C4. Service provider $102_n$ also instantiates containers/realms within its TEE for each of the encrypted data compartments. For example, service provider $102_n$ may schedule compartment data and execution data within respective isolated execution environments (e.g., the restricted realm, sensitive, realm, unclassified realm, etc.) with its TEE. As noted previously, such realms may be temporal execution environments such as a secure enclave or a virtual machine under the control of the service provider task environment protecting the E1 key exchange key (illustrated in the FIG. as a hashed box surrounding E1. Service provider $102_n$ may securely distribute respective compartment keys (C2, C3, etc.) to a relevant compartment.

The client can ensure that secure distribution occurs by sealing compartment keys to the compartment execution environments specified in the attestation proof. In such instances, the sealed compartment keys may only be used by service provider $102_n$ when the TEE matches measurements contained in the attestation proof. Sealed key unwrap may be supported by a hardware security module, such as a trusted platform module. Sealed keys specific to execution realms/compartments are depicted in FIG. 5 as E2, E3, and E4. In any case, service provider $102_n$ may use the unwrapped compartment keys (C2, C3, C4) to decrypt the data contained in each compartment. Execution of the trusted task may then occur on the decrypted data in the context of each data compartment/realm.

In step 4, service provider $102_n$ may provision the results of the executed trusted task for transmission and/or retrieval by client 101. In this regard, service provider $102_n$ may collect the results of trusted operations performed on the data of each compartment/realm, and encrypt the results with the corresponding compartment key, such as E2, E3, E4, etc. (in the case of sealed keys) or C2, C3, C4 (etc. in the case of unsealed keys). Optionally, the encrypted results may be further encrypted, e.g., using time stamp metadata. The encrypted results may then be transmitted to client 101 for consumption. Alternatively or additionally, the encrypted results may be provisioned to a storage medium which may be accessed by client 101

In one non-limiting embodiment, steps 1 and 3 described above may employ a first Sigma session to transfer information from client 101 to service provider $102_n$, and steps 2 and 4 may employ a second Sigma session to transfer information from service provider $102_n$ to client 101. In such instances, the client may send the signed policy in step 1 to the service provider using a "taskinfo" parameter in the flow of the first Sigma session. Similarly, the service provider may send the attestation signal in step 3 using a "taskinfo.

In sum, the clients and service providers described herein may use the "basename" and "taskinfo" parameters of a sigma session to determine identity and trust properties of each other in an otherwise anonymous exchange.

Reference is now made to FIG. 6, which is a flow chart of another exemplary method in accordance with the present disclosure. As will be seen, many of the steps in FIG. 6 are similar to those described in connection with prior FIGS. Thus, a detailed description of each step of FIG. 6 is not reiterated here. As shown, method 600 begins at block 601. At block 602, a client may initiate a trusted task on a service provider by opening a key exchange session with the service provider's TEE. Such a key exchange session may be a sigma protocol session or another key exchange session, as previously described.

At block 603, the client may send a policy describing a desired TEE environment and applicable security and/or compartmentalization context to the service provider. At block 604, the service provider can consider the policy and produce a proof showing that it has the ability to host the client's workload (i.e., to perform the trusted task). This proof may be exchanged with and analyzed by the client using an attestation protocol such as remote attestation, direct autonomous attestation, another attestation protocol, and the client. The proof includes, among other things, parameters that describe the service provider's TEE.

At block 605 (and assuming that the service provider can adequately host the client's workload), the client may prepare data and code associated with the trusted task for remote execution on the Service Provider's TEE. More specifically, the client may encrypt the data and code using derived data encryption keys, where a different key is used for data/code of different sensitivity. The method then proceeds to block 606, wherein the client's data encryption keys may be wrapped by a client key exchange key (CKEK) that is derived from a user specific distributed tasking key (e.g., C0). At block 607, the service provider's key exchange key (SKEK) may be shared with the client during the key exchange session (e.g., the Sigma protocol).

At block 608, the client's data encryption keys for each compartment may be sealed by the client to the service provider's TEE using the parameters supplied to the client during the service provider's attestation of its TEE environment (i.e., in block 604). At block 609, the client may seal its data encryption keys using the SKEK provided in block 607. At block 610, the client may send its encrypted data, code, and sealed data compartment keys to the service provider. At block 611, the service provider may instantiate (construct) compartments in its TEE for data and code specified by the client's policy. At block 612, the service provider may install the client's sealed data encryption keys, data and code in respective compartments that were instantiated in block 611.

At block 613, each compartment within the service provider TEE may perform a trusted launch using a technology that enforces unseal semantics on the client's sealed data encryption keys. Such technology may be Intel™ trusted execution technology (TXT, which may leverage a compartment trusted platform module) or another technology. Unless the client's sealed data encryption keys may not be unwrapped unless they are in the correct compartment within the service provider's TEE.

At block 614, each compartment within the service provider's TEE may decrypt the client's data and/or code and execute the workload associated with a trusted task specified by the client. Results of the trusted task for each compartment may then be collected by the service provider and encrypted using the client's data encryption keys. The encrypted results may then be wrapped by the service provider with time stamp metadata using the SKEK and delivered to the client, as shown in block 615.

At block 616, the client may unwrap the encrypted results using the SKEK that was previously exchanged (e.g. pursuant to block 607). The client may then decrypt the encrypted results using the client's respective data encryption keys, as shown in block 617. At block 618, the method ends.

As may be appreciated from the foregoing, the systems and methods of the present disclosure may offer one or more advantages. For example, prior to the transmission of sensitive client data and/or code to a remote node (i.e., a service provider), the client may first verify that the remote nodes execution environment (TEE) meets the client's security requirements. This can enhance the security of the client's sensitive data and/or code by preventing undesired transmission to nodes that do not meet such security requirements.

The systems and methods of the present disclosure may also enhance the security of the client's sensitive data through the use of data compartments in a service provider's TEE. As explained previously, such compartments may be specifically constructed to house the client's sensitive data and/or code in accordance with a policy specified by the client prior to transmission of the data/code to the service provider. That is, such compartments may be constructed to separately house data of different security levels and/or compartmentalization.

As also explained previously, each node (client and service provider) may have a per user specific distributed tasking key (e.g., C0, E0), that is used to derive operational keys (e.g., C1-C4, E1-E4, etc.). The user specific distributed tasking key may be a local key that is not shared between nodes. This may ensure that the operational keys derived from a user specific taking key are node specific.

In the systems and methods described herein, each node (client, service provider) in a distributed computing system may share an operation key (e.g., C1, E1) with other nodes on the system and establish a trusted relationship with such other nodes. Once a relationship between nodes is established, less time may be needed to schedule subsequent operations using such nodes.

In addition, a client node in the systems and methods described herein may seal the client's data encryption keys to data compartments created in a service provider's TEE. As a result, the client's data encryption keys may not be decrypted or otherwise accessed outside of such compartments. This may protect the client's data encryption keys from access by third parties, even if the service provider is compromised.

Finally, any or all of the nodes (client, service provider) in the systems and methods of the present disclosure may remain anonymous during the execution of a trusted task. For example, anonymity of one or more nodes may be maintained using EPID, including long and short lived EPID authentication keys.

One example of the present disclosure is a client device. The client device includes a processor, communications circuitry, a memory, and a client attestation module. The client attestation module includes computer readable trusted task initiation module (TTIM) instructions stored therein. The TTIM instructions when executed by the processor cause said client device to perform the following operations including: output a trusted task initiation signal (TTIS) with said communications circuitry, said TTIS comprising a policy that includes at least one criterion that defines an acceptable environment for the execution of trusted task; determine whether a trusted execution environment (TEE) of at least one service provider device is capable of meeting said criterion; if the TEE of the at least one service provider device is capable of meeting said at least one criterion, transmitting a second signal containing at least one of data and code associated with the trusted task to at least one service provider device for execution; and retrieve results produced by the execution of the trusted task on at least one of the data and code.

Another exemplary client device includes any or all of the foregoing components, wherein the policy further includes at least one of security context and compartmentalization context associated with at least one of the data and the code.

Another exemplary client device includes any or all of the foregoing components, wherein the TTIM instructions when executed by the processor cause the client device to encrypt at least one of the data and code prior to sending the second signal to the service provider device, thereby producing at least one of encrypted data and encrypted code; wherein the second signal contains at least one of the encrypted data and the encrypted code.

Another exemplary client device includes any or all of the foregoing components, wherein the policy further includes at least one of security context and compartmentalization context associated with at least one of the data and code; and the encrypting includes: deriving data encryption keys for each of a plurality of compartments defined by at least one of the security context and compartmentalization context for at least one of the data and the code; and encrypting each compartment of the plurality of compartments with a respective one of the data encryption keys.

Another exemplary client device includes any or all of the foregoing components, wherein the TTIS instructions when executed by the processor cause the client device to perform the following additional operations including: derive a client key exchange key (CKEK) from a user specific distributed task key that is private to the client device; establish a key exchange session with the service provider device; share the CKEK with the service provider device during the key exchange session; wrap the data encryption keys with the CKEK, thereby producing wrapped data encryption keys; and transmit the wrapped data encryption keys to the service provider device with the second signal.

Another exemplary client device includes any or all of the foregoing components, wherein the TTIS instructions when executed by the processor cause the client device to perform the following additional operations including: seal the data encryption keys to secure compartments within the TEE of the service provider device, based on information provided in an attestation signal received from the service provider device.

Another exemplary client device includes any or all of the foregoing components, wherein the TTIS instructions when executed by the processor cause the client device to perform the following additional operations including: seal the data encryption keys to secure compartments within the TEE of the service provider device, based on information provided in an attestation signal received from the service provider device; wherein the sealing includes wrapping the data encryption keys with a service provider key exchange key (SKEK) obtained by the client device during the key exchange session, thereby producing sealed data encryption keys.

Another example of the present disclosure is a service provider device. The service provider device may includes a processor; communications circuitry; a memory; and a service provider attestation module having computer readable trusted task execution module (TTEM) instructions stored therein. The TTEM instructions when executed by the processor cause the service provider device to perform the following operations including: in response to a policy contained in a trusted task initiation signal (TTIS) received from a client device, output an attestation signal to the client device with the communications circuitry, the attestation signal including information attesting to the service provider device's capability to execute a trusted task in a trusted execution environment (TEE); in response to receiving a second signal from a client device that contains at least one of data and code associated with the trusted task, instantiate at least one secure data compartment in the TEE that is populated with at least one of the data and code; execute the trusted task on at least one of the data and code within the at least one secure data compartment; and output the results of the trusted task within the at least one secure data compartment.

Another exemplary service provider device includes any or all of the foregoing components, wherein the TEE is provided using at least one of virtualization technology, hardware security module technology, and secure enclave technology.

Another exemplary service provider device includes any or all of the foregoing components, wherein the TTEM instructions when executed by the processor further cause the service provider device to instantiate a plurality of secure data compartments in the TEE in accordance with at least one of security context and compartmentalization context included in the policy.

Another exemplary service provider device includes any or all of the foregoing components, wherein the TTEM instructions when executed by the processor cause the service provider device to perform the following additional operations including: transmit a service provider key exchange key (SKEK) to the client device in a key exchange session; and receive a client key exchange key (CKEK) from the client device in the key exchange session.

Another exemplary service provider device includes any or all of the foregoing components, wherein the second signal includes data encryption keys for each of a plurality of data compartments specified by at least one of security context and compartmentalization context included in the policy, the data encryption keys being sealed with the SKEK; and the TTEM instructions when executed cause the service provider device to unseal the data encryption keys using the SKEK, thereby producing unsealed data encryption keys.

Another exemplary service provider device includes any or all of the foregoing components, wherein: the data and code in the second signal are apportioned into respective compartments in accordance with at least one of the security context and the compartmentalization context, each compartment being encrypted with a respective data encryption key; and the TTEM instructions when executed by the processor cause the service provider device to decrypt at least one of the data and the code with at least one of the unsealed data encryption keys.

Another exemplary service provider device includes any or all of the foregoing components, wherein during the output, the processor performs the following operations including: encrypt the results with the unsealed data encryption keys, thereby producing encrypted results; wrap the encrypted results with at least one of timestamp metadata and the SKEK, thereby producing wrapped encrypted results; and communicate the wrapped encrypted results to the client device.

Another example of the present disclosure is at least one computer readable medium including trusted task initiation module (TTIM) instruction stored therein. The TTIM instructions when executed by a processor cause the processor to perform the following operations including: output a trusted task initiation signal (TTIS), the TTIS including a policy that includes at least one criterion that defines an acceptable environment for the execution of a trusted task; in response to receiving an attestation signal from a service provider device, determine whether a trusted execution environment (TEE) of the service provider device is capable of meeting the at least one criterion; if the TEE is capable of meeting the criterion, transmitting a second signal containing at least one of data and code associated with the trusted task to the service provider device; and retrieve results produced by the execution of the trusted task on at least one of the data and code.

Another exemplary at least one computer readable medium including TTIM instructions includes any or all of the foregoing elements, wherein the policy further includes at least one of security context and compartmentalization context associated with at least one of the data and the code.

Another exemplary at least one computer readable medium including TTIM instructions includes any or all of the foregoing elements, wherein the TTIM instructions when executed by a processor cause the processor to perform the following additional operations including: encrypt at least one of the data and code prior to sending the second signal to the service provider, thereby producing at least one of encrypted data and encrypted code; and transmit at least one of the encrypted data and the encrypted code in the second signal.

Another exemplary at least one computer readable medium including TTIM instructions includes any or all of the foregoing elements, wherein: the policy further includes at least one of security context and compartmentalization context associated with at least one of the data and the code; and the encrypting includes: deriving data encryption keys for each of a plurality of compartments defined by at least one of the security context and compartmentalization context for at least one of the data and the code; and encrypting each compartment of the plurality of compartments with a respective one of the data encryption keys.

Another exemplary at least one computer readable medium including TTIM instructions includes any or all of the foregoing elements, wherein the TTIM instructions when executed by the processor further cause the processor to: derive a client key exchange key (CKEK) from a private user specific distributed task key; establish a key exchange session with the service provider device; transmit the CKEK to the service provider device and receive a service provider key exchange key in the key exchange session; wrap the data encryption keys with the CKEK, thereby producing wrapped data encryption keys; and transmit the wrapped data encryption keys to the service provider device with the second signal.

Another exemplary at least one computer readable medium including TTIM instructions includes any or all of the foregoing elements, wherein the TTIM instructions when executed by the processor further cause the processor to seal the data encryption keys to secure compartments within the TEE of the service provider device, based on information in the attestation signal, thereby producing sealed data encryption keys.

Another exemplary at least one computer readable medium including TTIM instructions includes any or all of the foregoing elements, wherein the processor seals the data encryption keys by wrapping the data encryption keys with a service provider key exchange key (SKEK) received from the service provider device during the key exchange session.

Another exemplary at least one computer readable medium including TTIM instructions includes any or all of the foregoing elements, wherein the TTIM instructions when executed by the processor further cause the processor to transmit the sealed data encryption keys to the service provider device with the second signal.

Another example of the present disclosure is at least one computer readable medium including trusted task execution module (TTEM) instructions stored therein. The TTEM instructions when executed by a processor cause the processor to perform the following operations including: in response to a policy contained in a trusted task initiation signal (TTIS) received from a client device, output an attestation signal to the client device, the attestation signal including information attesting to a service provider device's capability to execute a trusted task in a trusted execution environment (TEE); in response to receiving a second signal from the client device that contains at least one of data and code associated with the trusted task: instantiate at least one secure data compartment in the TEE that is populated with at least one of the data and code; execute the trusted task on at least one of the data and code within the at least one secure data compartment; and output the results of the trusted task within the at least one secure data compartment.

Another exemplary at least one computer readable medium including TTEM instructions stored therein includes any or all of the foregoing components, wherein the at least one secure data compartment is instantiated in the TEE in accordance with at least one of security context and compartmentalization context included in the policy.

Another exemplary at least one computer readable medium including TTEM instructions stored therein includes any or all of the foregoing components, wherein the TTEM instructions when executed by the processor cause the service provider device to perform the following additional operations including: transmit a service provider key exchange key (SKEK) to the client device in a key exchange session; and receive a client key exchange key (CKEK) from the client device in the key exchange session.

Another exemplary at least one computer readable medium including TTEM instructions stored therein includes any or all of the foregoing components, wherein: the second signal includes data encryption keys for each of a plurality of data compartments specified by at least one of security context and compartmentalization context included in the policy, the data encryption keys being sealed with the SKEK; and the TTEM instructions when executed cause the processor to unseal the data encryption keys using the SKEK, thereby producing unsealed data encryption keys.

Another exemplary at least one computer readable medium including TTEM instructions stored therein includes any or all of the foregoing components, wherein: at least one of the data and code in the second signal are apportioned into respective compartments in accordance with at least one of the security context and the compartmentalization context, each compartment being encrypted with a respective data encryption key; and the TTEM instructions when executed by the processor cause the service provider device to decrypt at least one of the data and the code with at least one of the unsealed data encryption keys.

Another exemplary at least one computer readable medium including TTEM instructions stored therein includes any or all of the foregoing components, wherein during the output the processor performs the following operations including: encrypting the results with the unsealed data compartment encryption keys, thereby producing encrypted results; wrapping the encrypted results with at least one of timestamp metadata and the SKEK, thereby producing wrapped encrypted results; and communicating the wrapped encrypted results to the client device.

Another example of the present disclosure is a first method. The first method includes: outputting a trusted task initiation signal (TTIS) with a client device, the TTIS including a policy that includes at least one criterion that defines an acceptable environment for the execution of a trusted task; in response to an attestation signal from a service provider device, determining with the client device whether a trusted execution environment (TEE) of the service provider device is capable of meeting the at least one criterion; if the TEE is capable of meeting the criterion, transmitting with the client device a second signal containing at least one of data and code associated with the trusted task to the service provider device; and retrieving with the client device results produced by the execution of the trusted task on at least one of the data and code.

Another exemplary first method in accordance with the present disclosure includes any or all of the foregoing components, wherein the policy further includes at least one of security context and compartmentalization context associated with at least one of the data and the code.

Another exemplary first method in accordance with the present disclosure includes any or all of the foregoing components, and further includes: prior to sending the second signal to the service provider, encrypting at least one of the data and code with the client device, thereby producing at least one of encrypted data and encrypted code; and transmitting at least one of the encrypted data and the encrypted code in the second signal.

Another exemplary first method in accordance with the present disclosure includes any or all of the foregoing components, wherein: the policy further includes at least one of security context and compartmentalization context associated with at least one of the data and the code; and the encrypting includes: deriving with the client device data encryption key for each of a plurality of compartments defined by at least one of the security context and compartmentalization context for at least one of the data and the code; and encrypting with the client device each compartment of the plurality of compartments with a respective one of the data encryption keys.

Another exemplary first method in accordance with the present disclosure includes any or all of the foregoing components, and further includes deriving with the client device a client key exchange key (CKEK) from a user specific distributed task key that is private to the client device; transmitting the CKEK from the client device to the service provider device in a key exchange session; wrapping the data encryption keys with the CKEK, thereby producing wrapped data encryption keys; and transmitting the wrapped data encryption keys to the service provider device with the second signal.

Another exemplary first method in accordance with the present disclosure includes any or all of the foregoing components, and further includes sealing the data encryption keys to secure compartments within the TEE of the service provider device based on information in the attestation signal, thereby producing sealed data encryption keys.

Another exemplary first method in accordance with the present disclosure includes any or all of the foregoing components, wherein the sealing includes wrapping the data encryption keys with a service provider key exchange key (SKEK) obtained by the client device during the key exchange session.

Another exemplary first method in accordance with the present disclosure includes any or all of the foregoing components, and further includes transmitting the sealed data encryption keys to the service provider device with the second signal.

Another example of the present disclosure is a second method. The second method includes: in response to receiving a policy contained in a trusted task initiation signal (TTIS) from a client device, outputting with a service provider device an attestation signal to the client device, the attestation signal including information attesting to the service provider device's capability to execute a trusted task in a trusted execution environment (TEE); in response to receiving a second signal from the client device that contains at least one of data and code associated with the trusted task; instantiating with the service provider device at least one secure data compartment in the TEE that is populated with at least one of the data and code; executing with the service provider device the trusted task on at least one of the data and code within the at least one secure data compartment; and outputting with the service provider device the results of the trusted task within the at least one secure data compartment.

Another exemplary second method in accordance with the present disclosure includes any or all of the foregoing components, wherein the at least one secure data compartment is instantiated in the TEE in accordance with at least one of security context and compartmentalization context included in the policy.

Another exemplary second method in accordance with the present disclosure includes any or all of the foregoing components, and further includes: transmitting with the service provider device a service provider key exchange key (SKEK) to the client device in a key exchange session; and receiving with the service provider device a client key exchange key (CKEK) from the client device in the key exchange session.

Another exemplary second method in accordance with the present disclosure includes any or all of the foregoing components, and further includes: receiving with the service provider device sealed data encryption keys for each of a plurality of data compartments specified by at least one of security context and compartmentalization context included in the policy, the sealed data encryption keys being seal with the SKEK; and unsealing with the service provider device the data encryption keys using the SKEK, thereby producing unsealed data encryption keys.

Another exemplary second method in accordance with the present disclosure includes any or all of the foregoing components, wherein at least one of the data and code in the second signal are apportioned into respective compartments in accordance with at least one of the security context and the compartmentalization context, each compartment being encrypted with a respective data encryption key, the method further including decrypting with the service provider device at least one of the data and the code with at least one of the unsealed data encryption keys.

Another exemplary second method in accordance with the present disclosure includes any or all of the foregoing components, wherein the outputting includes: encrypting with the service provider device the results with the unsealed data compartment encryption keys, thereby producing encrypted results; wrapping with the service provider device the encrypted results with at least one of timestamp metadata and the SKEK, thereby producing wrapped encrypted results; and transmitting with the service provider device the wrapped encrypted results.

Another example of the present disclosure is a system. The system includes a client device and a service provider device. The client device includes a client processor and a client memory having computer readable trusted task initiation module (TTIM) instructions stored therein. The service provider device includes a service provider processor and a service provider memory having computer readable trusted task execution module (TTEM) instructions stored therein. The TTIM instructions and the TTEM instructions when executed by the client processor and service provider processor, respectively, cause one or both of the client device and service provider device to: exchange a client issued policy including criterion defining an acceptable trusted execution environment (TEE) for the execution of a trusted task; exchange a service provider attestation that attests to the service provider device's TEE; exchange at least one of data and code associated with the trusted task; and perform the trusted task on at least one of the data and code in the service provider device's TEE.

Another exemplary system in accordance with the present disclosure includes any or all of the foregoing components, wherein the service provider device's TEE is provisioned using at least one of virtualization technology, hardware security module technology, and secure enclave technology.

Another exemplary system in accordance with the present disclosure includes any or all of the foregoing components, wherein the client issued policy further includes at least one of security context and compartmentalization context associated with at least one of the data and the code.

Another exemplary system in accordance with the present disclosure includes any or all of the foregoing components, wherein the TTEM instructions when executed by the service provider processor causes the service provider device to instantiate one or more secure containers within the service provider's trusted execution environment in accordance with at least one of the security context and the compartmentalization context.

Another exemplary system in accordance with the present disclosure includes any or all of the foregoing components, wherein the TTIM instructions when executed by the client processor cause the client device to perform the following additional operations including: encrypting at least one of the data and code prior to the exchanging at least one of the data and the code associated with the trusted task, thereby producing at least one of encrypted data and encrypted code; wherein the exchanging at least one of the data and the code associated with the trusted task includes exchanging at least one of the encrypted data and the encrypted code.

Another exemplary system in accordance with the present disclosure includes any or all of the foregoing components, wherein the TTIM instructions when executed by the client processor further causes the client device to: derive data encryption keys for each of a plurality of compartments defined by at least one of the security context and compartmentalization context for at least one of the data and the code; and encrypt each compartment of the plurality of compartments with a respective one of the data encryption keys, thereby producing encrypted data compartments.

Another exemplary system in accordance with the present disclosure includes any or all of the foregoing components, wherein the TTIM instructions and the TTEM instructions when executed by the client processor and the service provider processor, respectively, cause the client device and service provider device to: establish a key exchange session; exchange a respective client key exchange key (CKEK) and service provide key exchange key (SKEK), the CKEK and SKEK being private keys to the client and the service provider, respectively.

Another exemplary system in accordance with the present disclosure includes any or all of the foregoing components, wherein the TTIM instructions when executed by the client processor further cause the client device to wrap the data encryption keys with the CKEK, thereby producing wrapped data encryption keys and transmit the wrapped data encryption keys to the service provider device; and the TTEM instructions when executed by the service provider processor further cause the service provider device to unwrap the data encryption keys and decrypt the encrypted data compartments with the data encryption keys.

Another exemplary system in accordance with the present disclosure includes any or all of the foregoing components, wherein: the TTIM instructions when executed by the client processor further cause the client device to deal the data encryption keys to the secure compartments within the trusted execution environment of the service provider using the SKEK; and the TTEM instructions when executed by the service provider processor further cause the service provider device to unseal the data encryption keys using the SKEK, thereby producing unsealed data encryption keys.

Another exemplary system in accordance with the present disclosure includes any or all of the foregoing components, wherein the TTEM instructions when executed by the service provider processor cause the service provider device to perform the following additional operations including: execute the trusted task on at least one of the data and the code, thereby producing results; and output the results to the client device.

Another exemplary system in accordance with the present disclosure includes any or all of the foregoing components, wherein the service provider device outputs the results by: encrypting the results with the unsealed data compartment encryption keys, thereby producing encrypted results; wrapping the encrypted results with at least one of timestamp metadata and the SKEK, thereby producing wrapped encrypted results; and communicating the wrapped encrypted results to the client device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A client device, comprising:
   a processor;
   communications circuitry;
   a memory; and
   a client attestation module configured to cause the client device to:
   output a trusted task initiation signal (TTIS) with said communications circuitry to a plurality of service provider devices of a distributed computing system, said TTIS specifying client defined characteristics of at least one trusted execution environment (TEE) and of a plurality of data compartments to be instantiated within said TEE for the execution of a trusted task, wherein each of the plurality of data compartments is to store a different portion of at least one of data and code to be operated upon during execution of said trusted task, and said TTIS specifies a different security level for each of said plurality of data compartments; and
   cause a selected one of said plurality of service provider devices that is able to instantiate a TEE and at least one data compartment to instantiate said TEE and said at least one data compartment in accordance with said client defined characteristics.

2. The client device of claim 1, wherein said client attestation module is further to cause the client device to:
   encrypt at least one of said data and said code so as to produce at least one of encrypted data and encrypted code; and
   transmit at least one of said encrypted data and said encrypted code to the selected one of said plurality of service provider devices.

3. The client device of claim 1, wherein said client attestation module is further to cause the client device to:
   derive a client key exchange key (CKEK) from a user specific distributed task key that is private to said client device;
   establish a key exchange session with the selected one of said plurality of service provider devices;
   share said CKEK with the selected one of said plurality of service provider devices during said key exchange session;
   wrap a data encryption key with said CKEK, thereby producing a wrapped data encryption key; and
   provide said wrapped data encryption key to the selected one of said plurality of service provider devices.

4. The client device of claim 3, wherein said client attestation module is further to cause said client device to:
   derive a plurality of data encryption keys;
   encrypt at least one of the data and code associated with each compartment of said plurality of said compartments with a respective one of said plurality of data encryption keys, thereby producing at least one of encrypted data and encrypted code; and
   seal one of more of said plurality of data encryption keys within one or more data compartments of a TEE of the selected one of said plurality of service provider devices.

5. The client device of claim 4, wherein said client attestation module is further to cause said client device to seal one of more of said plurality of data encryption keys within one or more data compartments of a TEE of the selected one of the plurality of service provider devices by wrapping said data encryption keys with a service provider key exchange key (SKEK) obtained by said client device during said key exchange session, thereby producing sealed data encryption keys.

6. A service provider device, comprising:
a processor;
communications circuitry;
a memory; and
a service provider attestation module configured to cause the service provider device to:
output, in response to receipt of a trusted task initiation signal (TTIS) from a client device of a distributed computing system, an attestation signal to said client device, the TTIS specifying client defined characteristics of at least one trusted execution environment (TEE) and of at least one data compartment to be instantiated within said TEE for the execution of a trusted task, the attestation signal being configured to attest to the service provider device's ability to instantiate a TEE and at least one data compartment within said TEE in accordance with said client defined characteristics; and
instantiate a TEE and at least one data compartment in accordance with said client defined characteristics in response to receiving a second signal from the client device that contains at least one of data and code associated with said trusted task.

7. The service provider device of claim 6, wherein:
said TTIS specifies client defined characteristics of a plurality of data compartments for the storage of different portions of at least one of said data and said code and a different security level for each of said plurality of data compartments; and
the service provider attestation module is further to cause said service provider device to instantiate a TEE including a plurality of data compartments in accordance with said client defined characteristics in response to receipt of said second signal.

8. The service provider device of claim 7, wherein said service provider attestation module is further to cause said service provider device to:
transmit a service provider key exchange key (SKEK) to said client device in a key exchange session; and
receive a client key exchange key (CKEK) from said client device in said key exchange session.

9. The service provider device of claim 8, wherein:
said second signal comprises data encryption keys for each of said plurality of data compartments specified by said client defined characteristics, said data encryption keys being sealed with said SKEK; and
said service provider attestation module is further to cause said service provider device to unseal said data encryption keys using said SKEK, thereby producing unsealed data encryption keys.

10. The service provider device of claim 9, wherein said service provider attestation module is further to cause said service provider device to:
apportion the data and code in said second signal into said plurality of secure data compartments in accordance with said client defined characteristics; and
encrypt each of said secure data compartments with a respective one of said data encryption keys.

11. The service provider device of claim 9, wherein said service provider attestation module is further cause said service provider device to decrypt at least one of said data and said code with at least one of said unsealed data encryption keys.

12. The service provider device of claim 9, wherein said service provider attestation module is further to cause said service provider device to execute said trusted task on at least one of said data and said code within said TEE; and
output results of the execution of said trusted task within said TEE.

13. The service provider device of claim 12, wherein said service provider attestation module is further to cause the service provider device to:
encrypt said results with at least one of said unsealed data encryption keys, thereby producing encrypted results;
wrap said encrypted results with at least one of timestamp metadata and said SKEK, thereby producing wrapped encrypted results; and
communicate said wrapped encrypted results to said client device.

14. At least one non-transitory computer readable medium comprising trusted task initiation module (TTIM) instructions stored therein, wherein said TTIM instructions when executed by a processor cause the processor to perform the following operations comprising:
output a trusted task initiation signal (TTIS) with said communications circuitry to a plurality of service provider devices of a distributed computing system, said TTIS specifying client defined characteristics of at least one trusted execution environment (TEE) and of a plurality of data compartments to be instantiated within said TEE for the execution of a trusted task, wherein each of the plurality of data compartments is to store different portions of at least one of data and code to be operated upon during execution of said trusted task, and said TTIS further specifies a different security level for each of said plurality of data compartments; and
cause a selected one of said plurality of service provider devices that is able to instantiate a TEE and at least one data compartment to instantiate said TEE and said at least one data compartment in accordance with said client defined characteristics.

15. The at least one computer readable medium of claim 14, wherein said TTIM instructions when executed by a processor cause the processor to perform the following additional operations comprising:
encrypt at least one of said data and said code so as to produce at least one of encrypted data and encrypted code; and
transmit at least one of said encrypted data and said encrypted code to the selected one of said plurality of service provider devices.

16. The at least one computer readable medium of claim 14, wherein said TTIM instructions when executed by said processor further cause said processor to:
derive a client key exchange key (CKEK) from a user specific distributed task key that is private to said client device;
establish a key exchange session with the selected one of said plurality of service provider devices;
share said CKEK with the selected one of said plurality of service provider devices during said key exchange session;
wrap a data encryption key with said CKEK, thereby producing a wrapped data encryption key; and
provide said wrapped data encryption key to the selected one of said plurality of service provider devices.

17. The at least one computer readable medium of claim 16, wherein said TTIM instructions when executed by said processor further cause said processor to:
derive a plurality of data encryption keys;
encrypt at least one of the data and code associated with each compartment of said plurality of said compartments with a respective one of said plurality of data encryption keys, thereby producing at least one of encrypted data and encrypted code; and seal one of more of said plurality of data encryption keys within one or more data compartments of a TEE of the selected one of said plurality of service provider devices.

18. The at least one computer readable medium of claim 17, wherein said TTIM instructions when executed cause said processor to seal one of more of said plurality of data encryption keys within one or more data compartments of a TEE of the selected one of the plurality of service provider devices by wrapping said data encryption keys with a service provider key exchange key (SKEK) obtained by said client device during said key exchange session, thereby producing sealed data encryption keys.

19. The at least one computer readable medium of claim 18, wherein said TTIM instructions when executed by said processor further cause said processor to transmit said sealed data encryption keys to said service provider device.

20. At least one non-transitory computer readable medium comprising trusted task execution module (TTEM) instructions stored therein, wherein said TTEM instructions when executed by a processor cause the processor to perform the following operations comprising:

output, in response to receipt of a trusted task initiation signal (TTIS) from a client device of a distributed computing system, an attestation signal to said client device, the TTIS specifying client defined characteristics of at least one trusted execution environment (TEE) and of at least one data compartment to be instantiated within said TEE for the execution of a trusted task, the attestation signal being configured to attest to the service provider device's ability to instantiate a TEE and at least one data compartment within said TEE in accordance with said client defined characteristics; and instantiate a TEE and at least one data compartment in accordance with said client defined characteristics in response to receiving a second signal from the client device that contains at least one of data and code associated with said trusted task.

21. The at least one computer readable medium of claim 20, wherein:

said TTIS specifies client defined characteristics of a plurality of data compartments for the storage of different portions of at least one of said data and said code and a different security level for each of said plurality of data compartments; and the service provider attestation module is further to cause said service provider device to instantiate a TEE including a plurality of data compartments in accordance with said client defined characteristics in response to receipt of said second signal.

22. The at least one computer readable medium of claim 21, wherein said TTEM instructions when executed by said processor cause said service provider device to perform the following additional operations comprising:

transmit a service provider key exchange key (SKEK) to said client device in a key exchange session; and receive a client key exchange key (CKEK) from said client device in said key exchange session.

23. The at least one computer readable medium of claim 22, wherein:

said second signal comprises data encryption keys for each of said plurality of data compartments specified by said client defined characteristics, said data encryption keys being sealed with said SKEK; and said service provider attestation module is further to cause said service provider device to unseal said data encryption keys using said SKEK, thereby producing unsealed data encryption keys.

24. The at least one computer readable medium of claim 23, wherein said TTEM instructions when executed by said processor cause said service provider device to perform the following additional operations comprising:

apportion the data and code in said second signal into said plurality of secure data compartments in accordance with said client defined characteristics; and encrypt each of said secure data compartments with a respective one of said data encryption keys.

25. The at least one computer readable medium of claim 23, wherein said TTEM instructions when executed by said processor cause said service provider device to decrypt at least one of said data and said code with at least one of said unsealed data encryption keys.

26. The at least one computer readable medium of claim 20, wherein said TTEM instructions when executed cause said processor to perform the following operations comprising:

execute said trusted task on at least one of said data and said code within said TEE; and output results of the execution of said trusted task within said TEE.

27. The at least one computer readable medium of claim 26, wherein said TTEM instructions when executed cause said processor to perform the following operations comprising:

encrypt said results with at least one of said unsealed data encryption keys, thereby producing encrypted results;

wrap said encrypted results with at least one of timestamp metadata and said SKEK, thereby producing wrapped encrypted results; and communicate said wrapped encrypted results to said client device.

* * * * *